United States Patent
Schlanger

(10) Patent No.: US 9,815,329 B2
(45) Date of Patent: Nov. 14, 2017

(54) VEHICLE WHEEL AXLE ASSEMBLY

(71) Applicant: Raphael Schlanger, Witon, CT (US)

(72) Inventor: Raphael Schlanger, Witon, CT (US)

(*) Notice: Subject to any disclaimer, the term of this patent is extended or adjusted under 35 U.S.C. 154(b) by 0 days.

(21) Appl. No.: 14/952,645

(22) Filed: Nov. 25, 2015

(65) Prior Publication Data
US 2016/0159427 A1    Jun. 9, 2016

Related U.S. Application Data

(63) Continuation-in-part of application No. 14/602,543, filed on Jan. 22, 2015, now Pat. No. 9,561,833, which is a continuation-in-part of application No. 13/914,490, filed on Jun. 10, 2013, now Pat. No. 9,446,626, which is a continuation-in-part of application No. 12/655,433, filed on Dec. 30, 2009, now Pat. No. 8,485,335.

(60) Provisional application No. 62/124,391, filed on Dec. 18, 2014, provisional application No. 61/965,201, filed on Jan. 27, 2014, provisional application No. 61/204,130, filed on Jan. 2, 2009.

(51) Int. Cl.
*B60B 27/02* (2006.01)
*B62K 25/02* (2006.01)

(52) U.S. Cl.
CPC ........... *B60B 27/026* (2013.01); *B62K 25/02* (2013.01); *B62K 2206/00* (2013.01)

(58) Field of Classification Search
CPC ..... B60B 27/023; B60B 27/026; B62K 25/02; B62K 25/025; B62K 2206/00
See application file for complete search history.

(56) References Cited

U.S. PATENT DOCUMENTS

| | | | |
|---|---|---|---|
| 6,089,675 A | 7/2000 | Schlanger | |
| 6,374,975 B1* | 4/2002 | Schlanger | B60B 27/026 192/46 |
| 7,665,928 B2* | 2/2010 | Winefordner | B60B 27/026 403/322.4 |
| 7,669,871 B2* | 3/2010 | Watarai | B62K 25/02 280/260 |
| 2003/0063962 A1* | 4/2003 | Nilsen | F16B 35/047 411/427 |
| 2004/0109740 A1* | 6/2004 | Nilsen | F16B 37/061 411/171 |

(Continued)

*Primary Examiner* — Kip T Kotter

(57) ABSTRACT

A hub assembly, including: an axle with an axial opening; a hub shell; a frame, including first and second frame members with respective first and second retaining surfaces; and a control shaft within the axial opening. The control shaft includes: an engagement end; a clamping end with an enlarged head portion with an inwardly facing grip face; a shank extending between the engagement and clamping ends; first and second engagement surfaces proximal the engagement and clamping ends respectively. The second frame member includes an open slot to receive the control shaft. The control shaft is axially displaceable between: a retracted position radially disengaged from both first and second frame members; and a pre-engaged position, where the first and second engagement surfaces are overlapping the first and second retaining surfaces in respective first and second radial engagements to radially retain the hub assembly with the first and second frame members.

41 Claims, 17 Drawing Sheets

(56) References Cited

U.S. PATENT DOCUMENTS

2008/0185907 A1* 8/2008 Hara ............... B60B 27/026
                                              301/111.03
2010/0096912 A1* 4/2010 Lude ............... B62K 25/02
                                              301/110.5

* cited by examiner

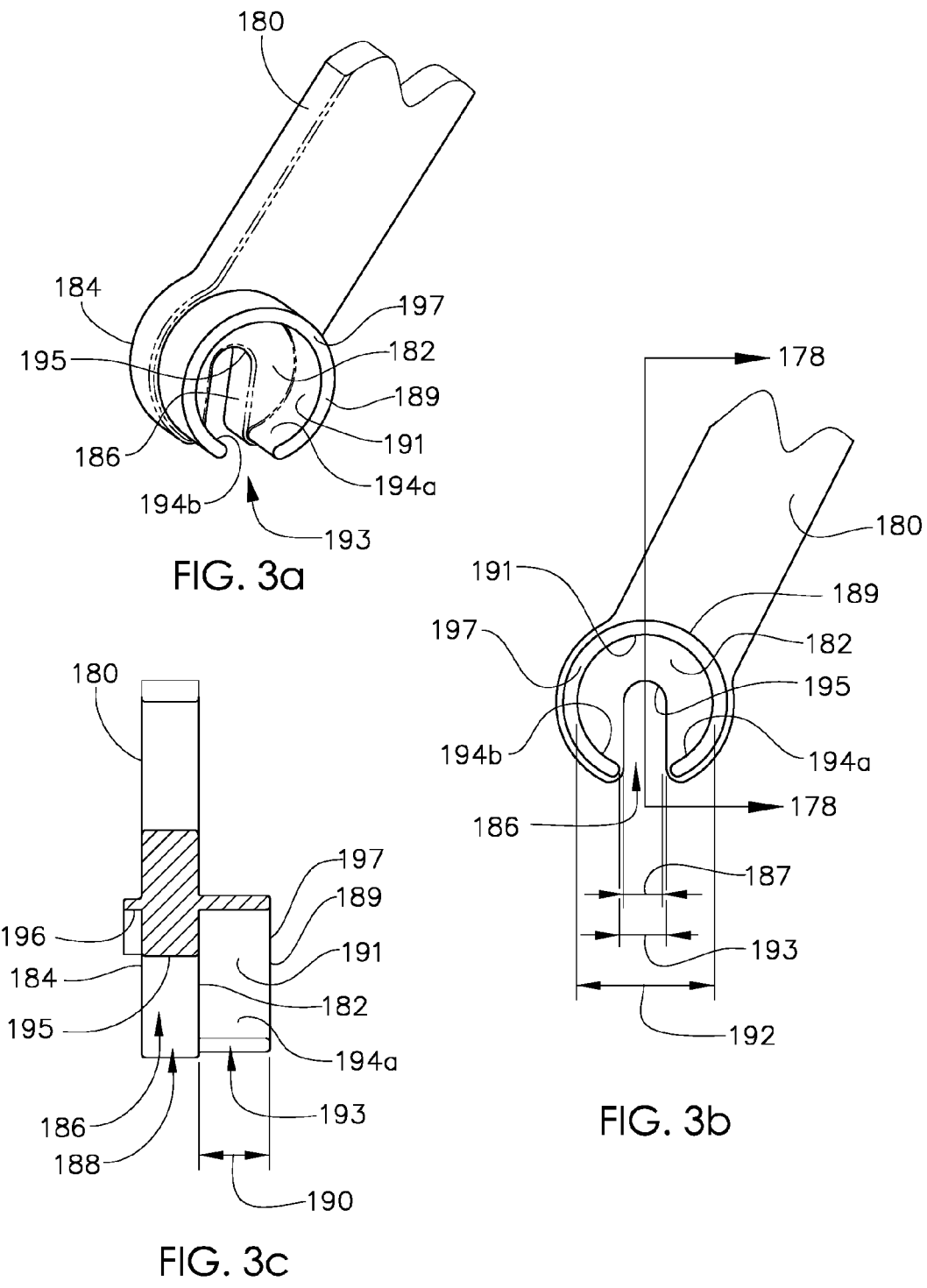

VEHICLE WHEEL AXLE ASSEMBLY

CROSS-REFERENCE TO RELATED APPLICATION

This application claims priority of U.S. Provisional Patent Application 62/124,391, filed Dec. 18, 2014 and entitled "VEHICLE HUB ASSEMBLY".

This application is also a Continuation-In-Part of U.S. patent application Ser. No. 14/602,543 filed Jan. 22, 2015 and entitled VEHICLE WHEEL AXLE ASSEMBLY, which is currently pending, and which claimed priority of U.S. Provisional Patent Application 61/965,201 filed Jan. 27, 2014.

U.S. patent application Ser. No. 14/602,543 is also a Continuation-In-Part of U.S. patent application Ser. No. 13/914,490 filed Jun. 10, 2013 and entitled VEHICLE WHEEL HUB ASSEMBLY, which is issued as U.S. Pat. No. 9,446,626, and which is a Continuation-In-Part of U.S. patent application Ser. No. 12/655,433 filed Dec. 30, 2009 and entitled TORQUE COUPLING ASSEMBLY, which is currently issued as U.S. Pat. No. 8,485,335.

BACKGROUND

Field of the Invention

The present invention relates to a vehicle wheel axle assembly, particularly including aspects that facilitate the connection between axle of a vehicle wheel and the frame to which the vehicle wheel is mounted. More specifically, the present invention relates to a vehicle wheel axle assembly that includes a control shaft that may be axially shuttled such that both ends of the control shaft are simultaneously engaged to the frame at a first axial position and simultaneously disengaged or released from the frame at a second axial position. The present invention is particularly applicable to a bicycle wheel axle assembly that facilitates the connection between axle of a bicycle wheel and the frame of a bicycle.

Discussion of Prior Art

Heretofore, the prior art mechanisms for the attachment and connection of bicycle wheels to the bicycle frame and/or fork has included two basic categories: the quick release skewer and the through-axle.

It is highly desirable to be able to install and uninstall the bicycle wheel to the frame very quickly and easily. Particularly in bicycle racing conditions, when every second counts, the ability to quickly swap out wheels (in the case of a flat tire, for instance) is critical. Reducing the time required to install and uninstall the wheel may result in the margin of difference between winning and losing the race.

It is also highly desirable that the system for wheel attachment be simple and intuitive to operate. The user must be able to learn its operation with a minimum of instruction. Further, this operation should not be overly complex or require a significant level of skill on the part of the operator. Still further, this system should minimize the number of separable parts that the operator must keep track of. Yet further, it is important that the system provide a robust and solid connection between the wheel and the frame (and/or fork) that also serves to create a stiff and robust connection between the dropouts of the frame.

The prior-art quick release skewer wheel attachment system utilizes a thin skewer shaft and this system relies on a certain level of elastic stretch of this shaft in order to function properly. The problem is that this thin shaft also serves to compromise the stiffness and robustness of this wheel attachment.

This system also requires the use of a cam lever and adjusting nut, where the operator must test the lever tension for proper lever tension "feel", then readjust the nut and try again. Even the most experienced operator commonly goes through this iterative adjustment procedure 3-4 times before being satisfied with the wheel attachment. Further, there is no reliable indication as to what constitutes the proper lever tension "feel". For less experienced operator, this operation is deemed quite complex not at all intuitive. And the level of judgment and interpretation required of the operator regarding the proper lever tension "feel" requires more experience than most users have. As such, the quick release skewer system requires a high degree of operator training, and even then, the reliability that this connection has been achieved properly is quite low. In fact, the quick release skewer system has resulted in numerous cases where the wheel has inadvertently become separated from the bicycle, resulting in serious injury and resulting in numerous lawsuits.

With the advent of mountain bikes, and with the desire to have a more robust and stiff wheel attachment system, the through axle has been utilized as a heavier-duty wheel attachment system. This system is similar to that used on motorcycles and has a separate axle element that is passed axially through the dropouts of the frame and through the axle sleeve of the wheel. This means that this separate axle component must be axially withdrawn over a very long distance in order to separate the wheel from the bicycle and must be axially inserted over the same distance for wheel installation. The result is that the through-axle system requires an excessive amount of time to achieve the attachment and removal of the wheel to/from the dropouts of the frame. Further, this axle is now an additional separate component that the operator must keep track of when the wheel is removed from the dropouts. For this reason, the through-axle system is commonly used only in heavier-duty mountain bike applications.

SUMMARY OF THE INVENTION

Objects and Advantages

In accordance with the present invention, it has now been found that the forgoing objects and advantages may be readily obtained.

It is an object of the invention to provide a vehicle wheel hub assembly where the vehicle wheel may be quickly and easily installed and/or uninstalled from the frame to which it is mounted. In contrast to a conventional through-axle arrangement, the hub assembly may be assembled to the frame by simply shuttling the axle by a short distance and then threadably tightening the axle. This is an easy operation that can be completed in a matter of a few seconds. Further, once the control shaft is in the pre-engaged position, both ends of the control shaft are automatically piloted and radially aligned with the dropouts, insuring that the subsequent threadable tightening will be achieved with no misalignment or binding for a trouble-free operation.

It is an object of the present invention to provide a hub assembly that is simple to use and is intuitive to operate. The threadable tightening required for assembly is common and intuitive. In contrast to a quick-release skewer, there is little, if any, training required to teach the operator to assemble or disassemble the hub assembly to/from the frame.

It is an object of the present invention to provide a hub assembly with safety features to insure that the vehicle wheel remains secured to the frame to which it is mounted. Once the pre-engaged position of the control shaft is initiated, both ends of the control shaft are instantly retained to the frame. This insures that the hub assembly will not become radially separated from the frame, even if the control shaft is inadvertently threadably loosened. The inclusion of a spring to bias the control shaft toward engagement serves to further support this radial engagement.

It is an object of the present invention to provide a secure and solid connection between the hub assembly and the frame to which it is mounted and to minimize flex and/or misalignment therebetween. In contrast to a conventional quick-release skewer system, which necessarily relies on a thin skewer shaft, the control shaft of the present invention may be of larger diameter, which reduces flex and serves to provide greater stiffness to the connection between the hub assembly and the frame.

Further objects and advantages of my invention will become apparent from considering the drawings and ensuing description.

BRIEF DESCRIPTION OF THE DRAWINGS

The present invention will be more readily understandable from a consideration of the accompanying drawings, wherein:

FIG. 2c shows the adapter and nut assembled to one dropout and the hub assembly axially aligned in preparation for assembly with the dropouts, and with the control shaft in the retracted position;

FIG. 2d shows the hub assembly positioned between the dropouts, with each axlecap radially nested within its respective adapter and slot, and with the control shaft still in the retracted position;

FIG. 2e shows the hub assembly positioned between the dropouts, with the control shaft axially extended and threadably engaged with the adapter in the engaged position to secure the hub assembly to the dropouts;

FIG. 2f shows the hub assembly as positioned in FIG. 2e, with the handle pivotally folded;

FIG. 2g shows the hub assembly positioned between the dropouts, with the control shaft axially retained in the retracted position, corresponding to the assembly sequence described in FIG. 2d;

FIG. 2h shows the hub assembly positioned between the dropouts, with the control shaft in the pre-engaged position such that it is axially released and advanced toward the extended position, corresponding to an intermediate assembly sequence between FIGS. 2d and 2e;

FIG. 2i shows the hub assembly positioned between the dropouts, with the control shaft in an engaged position such that it is axially extended and threadably engaged with the dropout adapter, and with the handle pivotally folded, corresponding to the assembly sequence described in FIG. 2f;

FIG. 3a is a perspective view of the alternate right dropout including a straight open slot therein and a retaining collar.

FIG. 3b is an orthogonal view of the dropout of FIG. 3a.

FIG. 3c is a cross sectional view, taken along 178-178, of the dropout of FIG. 3a.

FIG. 4c shows the hub assembly axially aligned in preparation for assembly with the dropouts, with the control shaft in the retracted position;

FIG. 4d shows the hub assembly positioned between the dropouts, with each axlecap radially nested within its respective projections, with the control shaft still in the retracted position;

FIG. 4e shows the hub assembly positioned between the dropouts, with the control shaft in a pre-engaged position such that it is axially released and advanced toward the extended position, with the key flange circumferentially keyed to the outboard projections, and with the stepped portion and step sleeve radially engaged to their respective pilot portions to radially retain the hub assembly to the dropouts;

FIG. 4f shows the hub assembly axially aligned in preparation for assembly with the dropouts, with the control shaft in the retracted position, corresponding to the assembly sequence described in FIG. 4c;

FIG. 4g shows the hub assembly positioned between the dropouts, with each axlecap radially nested within its respective projections, and with the control shaft still in the retracted position, corresponding to the assembly sequence of FIG. 4d;

FIG. 4h shows the hub assembly positioned between the dropouts, with the control shaft axially shuttled to the pre-engaged position, corresponding to the assembly sequence of FIG. 4e;

FIG. 4i shows the hub assembly positioned between the dropouts, with the key projections circumferentially engaged to the key flange and with the knob threadably tightened to axially clamp the hub assembly to the dropouts and to lock the radial engagement between the collar portions and their respective pilot regions in a final assembled and locked position.

DETAILED DESCRIPTION OF THE INVENTION

Figure 1:
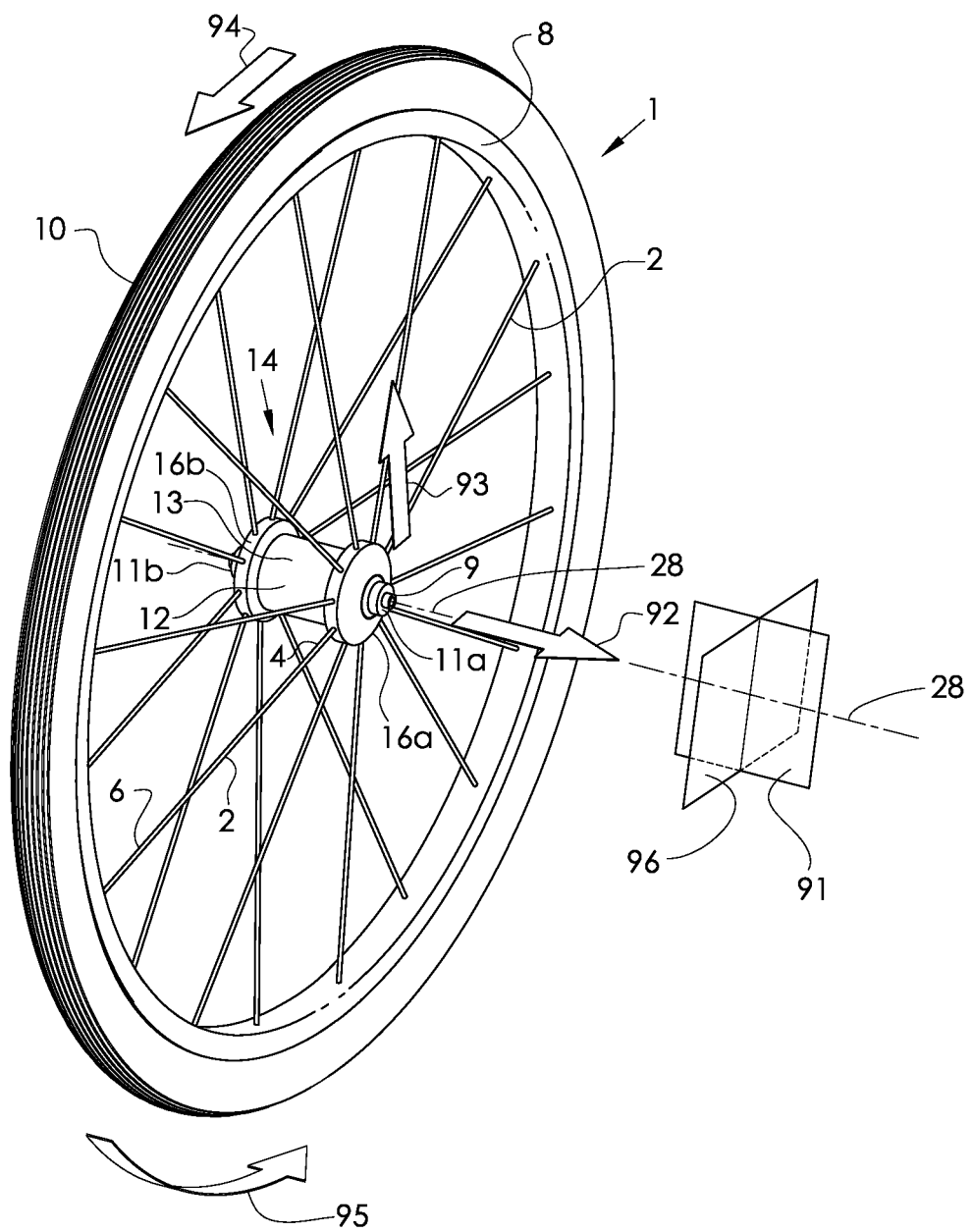
FIG. 1 is a perspective view schematically illustrating the general configuration of a prior art vehicle wheel as applied to a bicycle wheel.

FIG. 1 describes the basic configuration of an exemplary prior art vehicle wheel, in particular, a bicycle wheel 1, as well as a description of the direction conventions used throughout this disclosure. The hub assembly 14 includes a rotatable hub shell 12 and a stationary axle 9, with bearings (not shown) to facilitate rotation of the hub shell 12 about the axial axis 28. The hub shell 12 includes a hub body 13 with at least two axially spaced hub flanges 16a and 16b, each of which include a means for connecting with the spokes (not shown). The axle 9 includes end faces 11a and 11b to interface with the dropouts (not shown). The axial axis 28 is the axial centerline of rotation of the bicycle wheel 1. The hub flanges 22a and 22b may be contiguous with the hub shell 12 or may be separately formed and assembled to the hub body 13 portion of the hub shell 12. The spokes 2 are affixed to the hub flanges 22a or 22b at their first end 4 and extend to attach the rim 8 at their second end 6. The tire 10 is fitted to the outer periphery of the rim 8. The wheel of FIG. 1 is generic and may be of tension-spoke or compression-spoke design.

The axial direction 92 is a direction parallel with the axial axis 28. The radial direction 93 is a direction generally perpendicular to the axial direction 92 and extending generally from the axial axis 28 radially outwardly toward the rim 8. The tangential direction 94 is a direction perpendicular to both the radial direction 93 and axial direction 92, defining a generally tangent vector at a given radius. The circumferential direction 95 is a cylindrical vector that wraps around the axial axis 28 at a given radius. A radial plane 96 is a plane perpendicular to the axial axis 28 that extends in a generally radial direction at a given axial intercept. An axial plane 91 is a plane that is generally parallel to the axial axis.

In the ensuing descriptions, the term "axial" refers to a direction parallel to the centerline of the axial axis and the term "radial" refers to a direction perpendicular to the axial axis. An axially inboard (or inward) orientation is an orientation that is axially proximal to the axial midpoint between the two end faces 11a and 11b. Conversely, an axially outboard (or outward) orientation is an orientation that is axially distal to the axial midpoint between the two end faces 11a and 11b. A radially inboard (or inward) orientation is an orientation that is radially proximal to the axial axis 28 and a radially outboard (or outward) orientation is an orientation that is radially distal to the axial axis 28. An axially inboard (or inward) facing surface is a surface that faces toward the axial midpoint between the two end faces 11a and 11b. Conversely, an axially outboard (or outward) facing surface is a surface that faces away from the axial midpoint between the two end faces 11a and 11b.

While it is most common for the hub shell 12 to rotate about a fixed axle 9, there are some cases where it is desirable to permit the axle 9 to be fixed with the wheel 1 such as the case where the wheel 1 is driven by the axle 9.

Figure 2A:
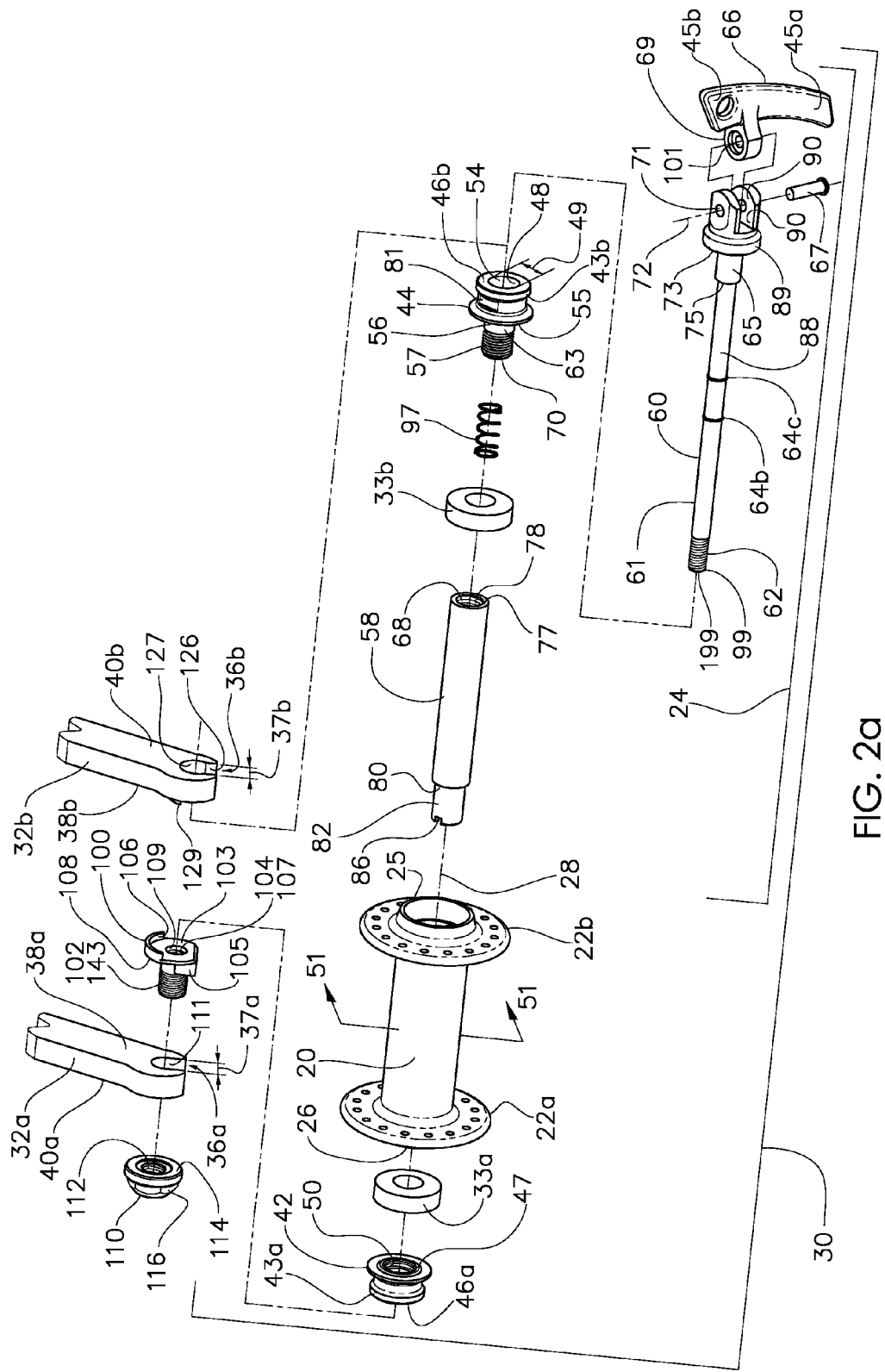
FIG. 2a is an exploded perspective view of a first embodiment of the present invention, showing the dropouts of the bicycle frame and a hub assembly, including a control shaft assembly.
Figure 2B:
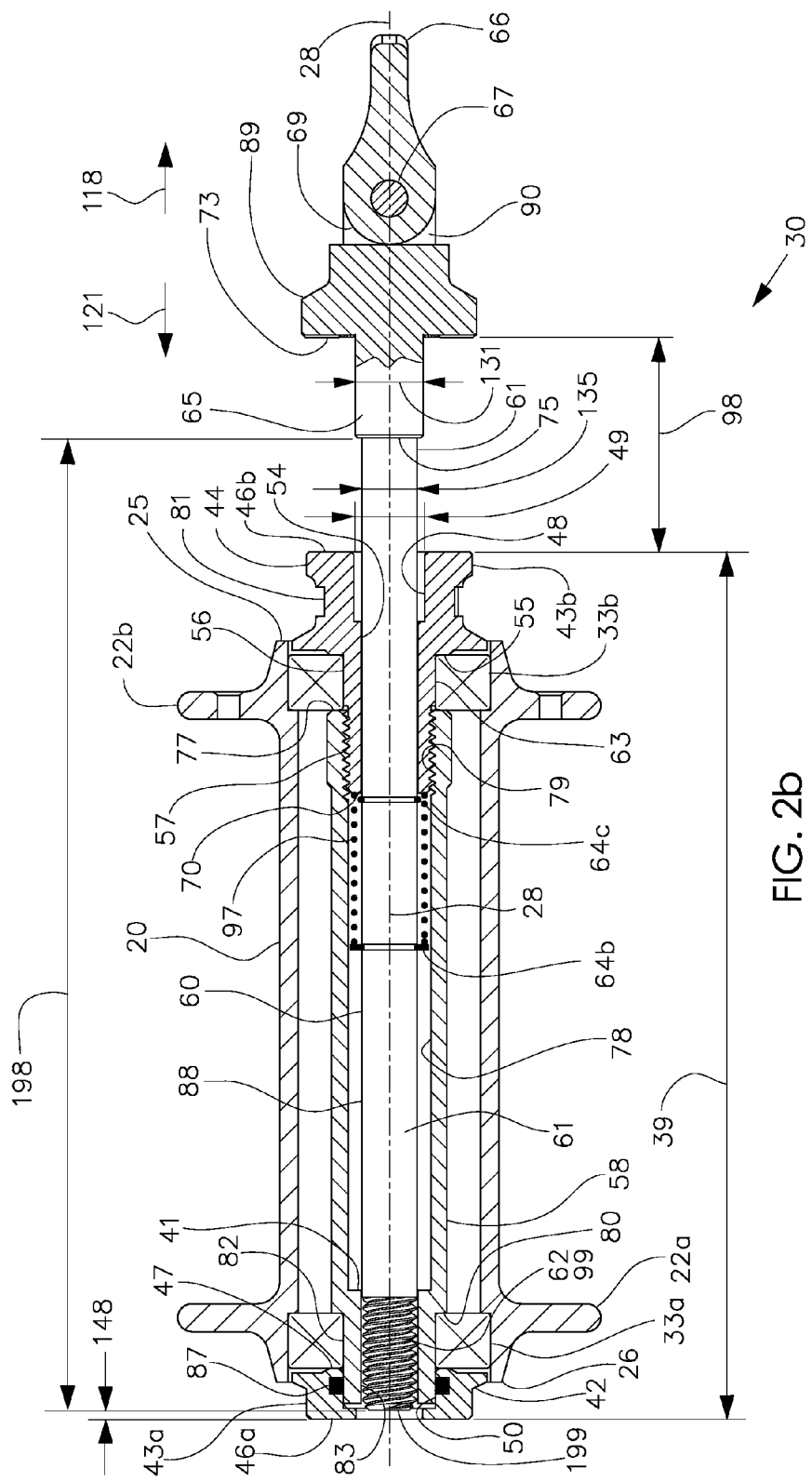
FIG. 2b is an axial cross-sectional view taken along 51-51 of the hub assembly of the embodiment of FIG. 2a, with the control shaft axially retained with the sleeve and positioned in the axially retracted position.
Figure 2C:
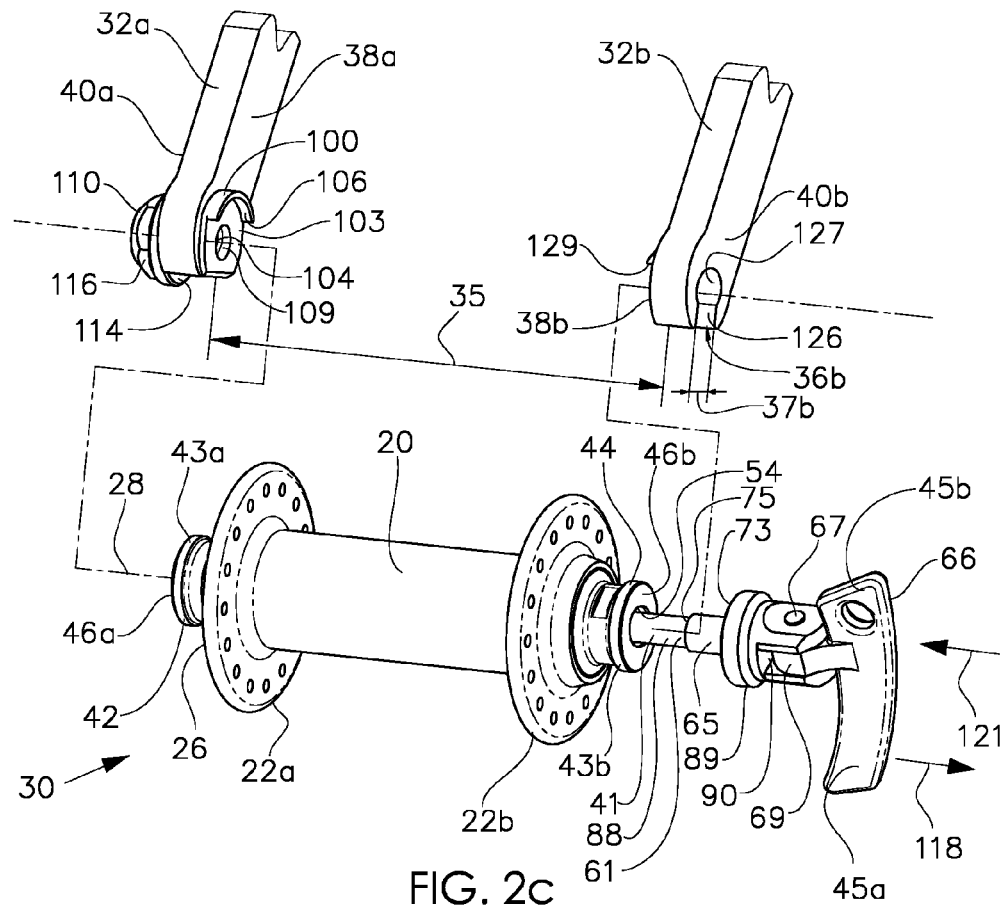
FIGS. 2c-f are perspective views of the embodiment of FIG. 2a, showing the progressive sequential assembly steps involved in assembling the hub assembly to the dropouts.
Figure 2D:
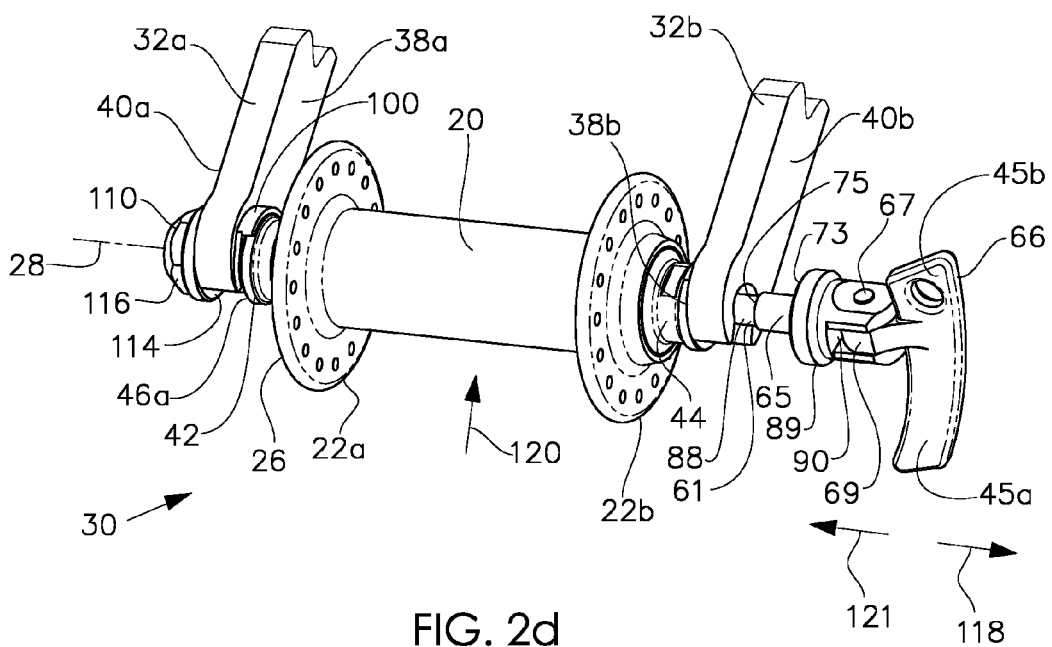
Figure 2E:
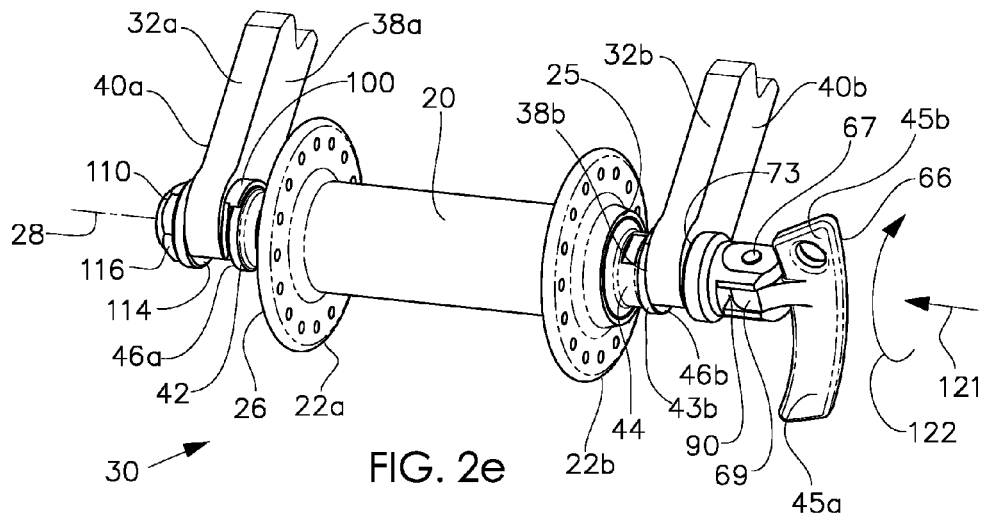
Figure 2F:
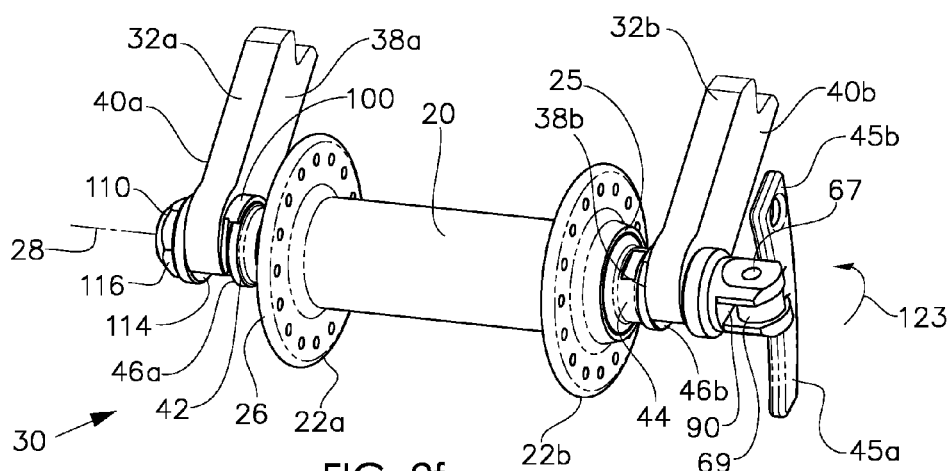
Figure 2G:
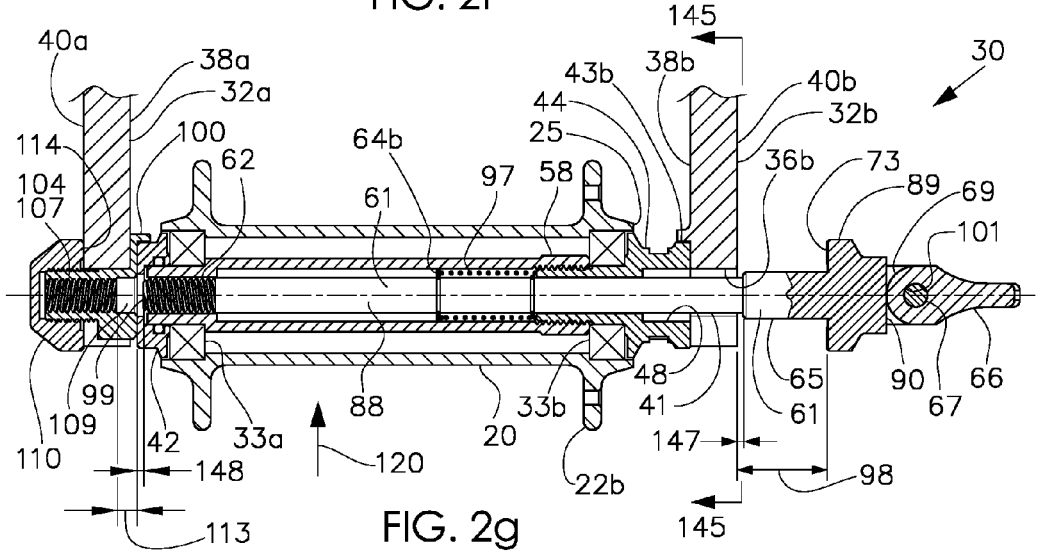
FIGS. 2g-i are axial cross-sectional views taken along 51-51 of the embodiment of FIG. 2a, showing the progressive sequential steps involved in assembling the hub assembly to the dropouts.
Figure 2H:
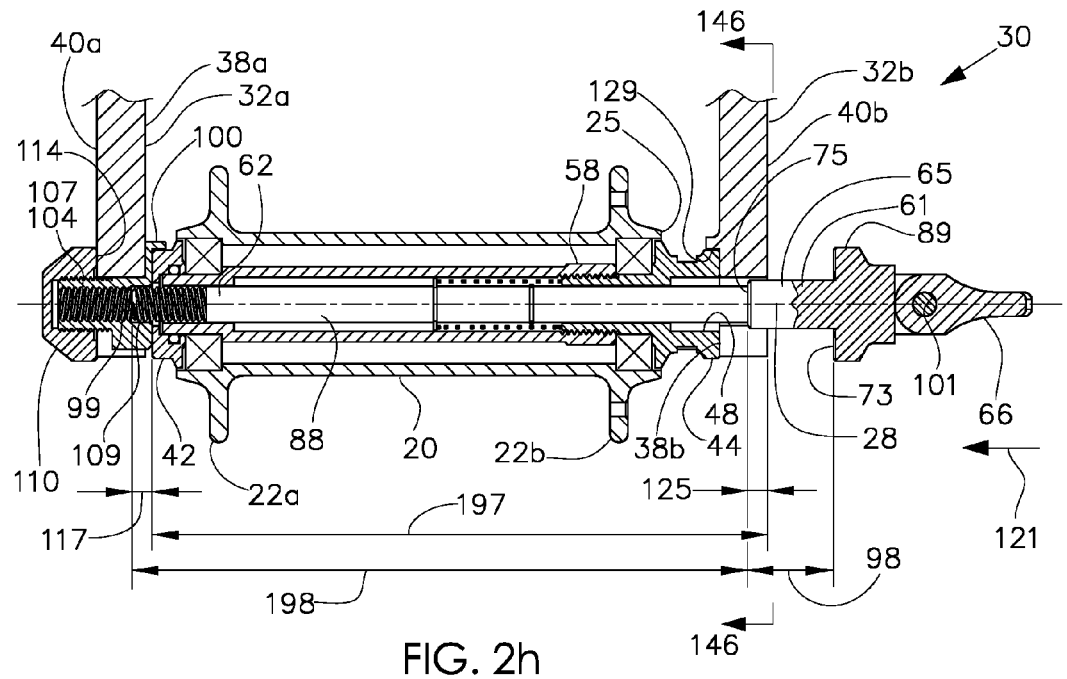
Figure 2I:
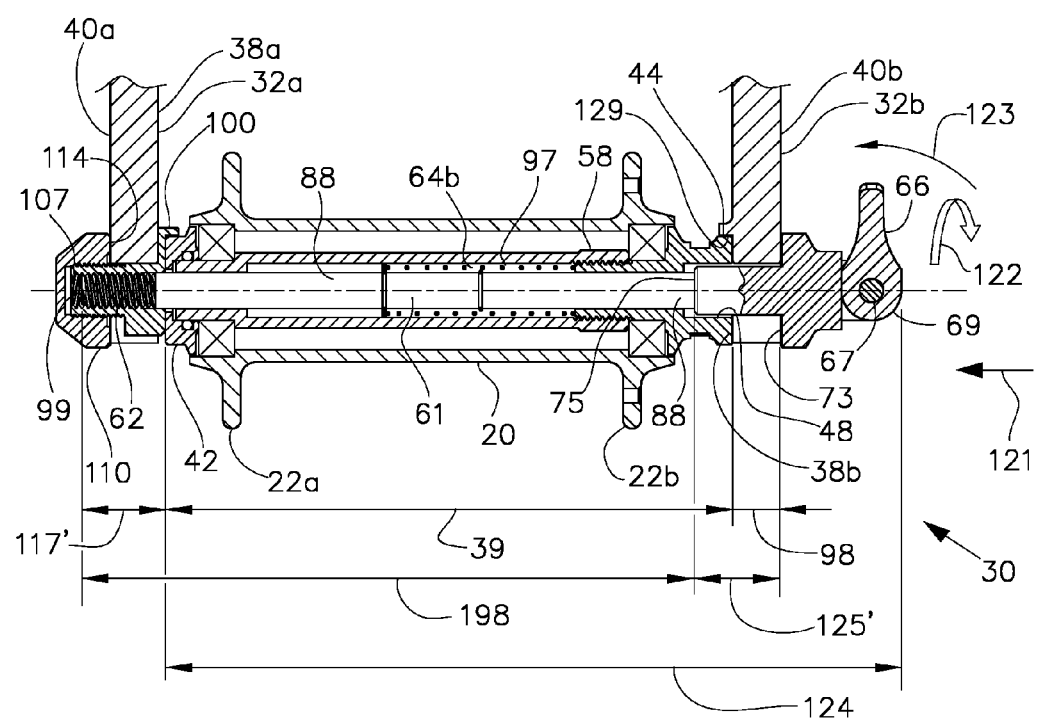
Figure 2J:
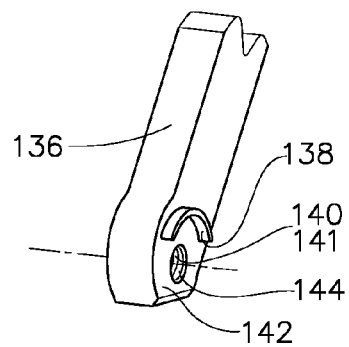
FIG. 2j is a perspective view of an alternate (left) dropout corresponding to the view of FIG. 2a, where the adapter and nut are eliminated in favor of an alternate dropout configuration that includes geometry otherwise associated with the adapter, including the alignment surface and internally threaded hole.
Figure 2K:
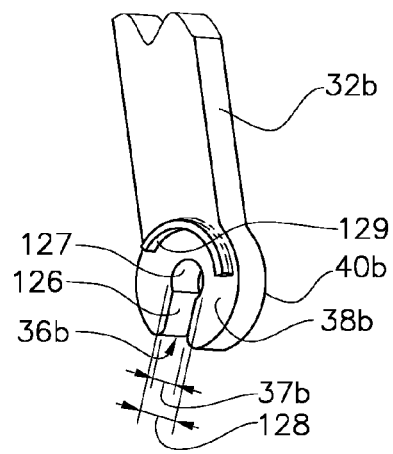
FIG. 2k is a perspective view of the right dropout of the embodiment of FIG. 2a, detailing the open keyhole dropout slot.
Figure 2L:
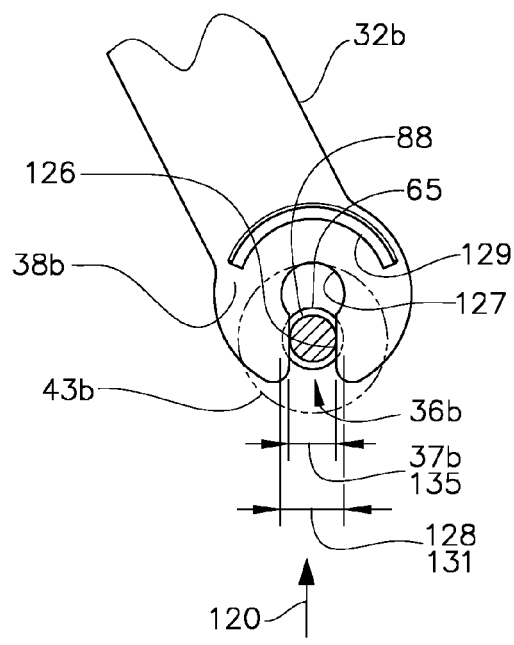
FIG. 2L is a partial cross section view of the embodiment of FIG. 2g, taken along 145-145, detailing the interaction between the control shaft and the right dropout, and corresponding to the transition between the assembly sequence of FIG. 2c and the assembly sequence of 2d (and 2g), with the shank portion of the control shaft passing radially within the necked region of the keyhole slot.
Figure 2M:
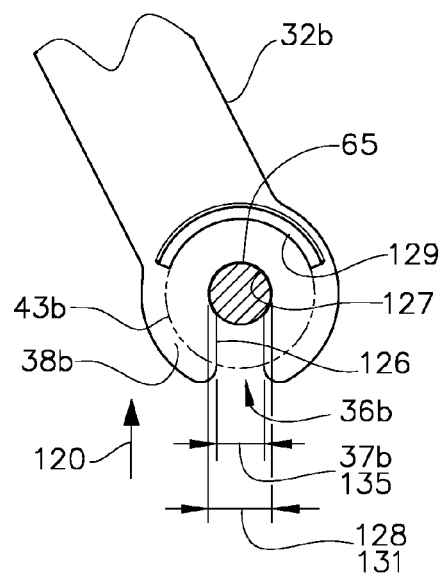
FIG. 2m is a partial cross section view of the embodiment of FIG. 2h, taken along 146-146, corresponding to the assembly sequence of FIG. 2e, FIG. 2f, FIG. 2h, and FIG. 2i, with the control shaft axially advanced toward the engagement position such that the stepped portion is positioned within the pilot region of the keyhole slot.
Figure 2N:
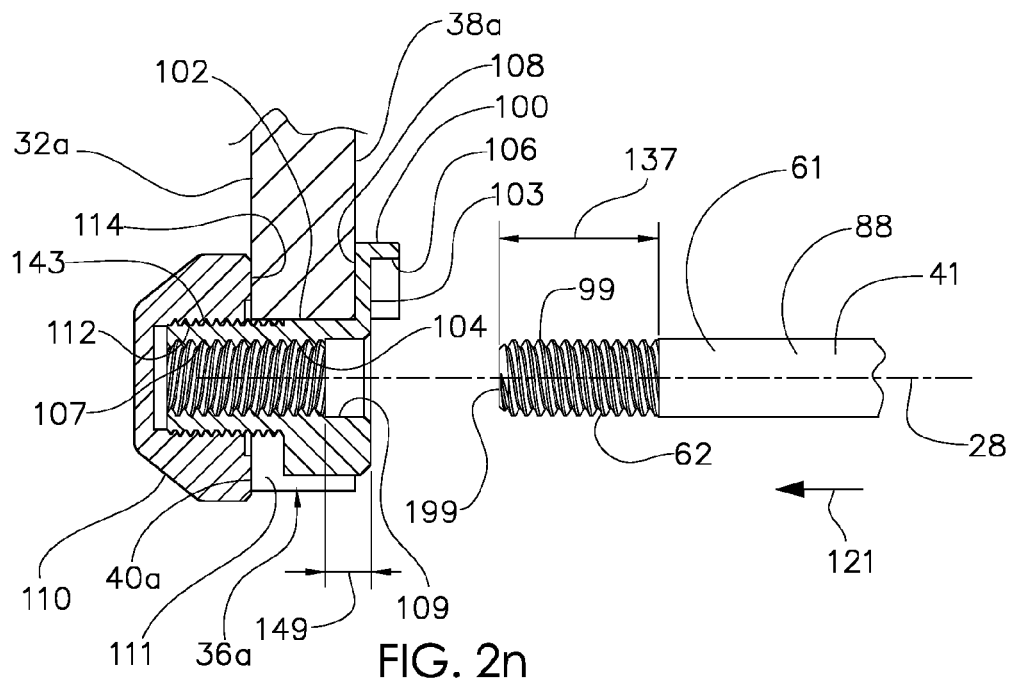
FIG. 2n is a partial cross sectional detail view of the embodiment of FIG. 2a, corresponding to the retracted position of FIGS. 2d and 2g, showing the counterbore of the adapter and the control shaft in greater detail.

FIGS. 2a-n describe an embodiment of the present invention with a threaded engagement between a control shaft of a hub assembly 30 and the dropout of the frame. In this embodiment, the frame includes an open-slotted dropout axially opposed to this threaded engagement, for quick and easy wheel removal. FIG. 2a is an exploded view, showing the individual components of this embodiment.

Referring to FIGS. 2a-n, dropouts 32a (left dropout) and 32b (right dropout) may be considered mounting portions of the bicycle (not shown) and constitute the portion of the frame (not shown) to which the hub assembly 30 is mounted or connected. Left dropout 32a is of a generally conventional design and includes open slot 36a of slot width 37a between slot sidewalls 111, axially inboard face 38a, and axially outboard face 40a. Right dropout 32b, as also shown in FIG. 2k, includes an open keyhole slot 36b that is radially stepped to include a narrower necked entrance region 126 of radial width 37b and a wider enlarged circular pilot region 127 of radial width 128. This radial step occurs within the axial region between inboard face 38b and outboard face 40b. Dropout 32b also includes an axially inboard face 38b, and an axially outboard face 40b. Inboard face 38b also includes an axially inwardly projecting alignment face 129 to provide radial positioning location of the alignment surface 43b of axlecap 44. Open keyhole slot 36b has a radially extending open entrance to receive the control shaft assembly 60.

Inboard faces 38a and 38b are axially opposed and face each other, while outboard faces 40a and 40b are axially opposed and face away from each other. Width 37a between sidewalls 111 of open slot 36a is sized to receive flats 105 of adapter 100. Width 37b of the necked entrance region 126 of open slot 36b is sized to receive the shank portion 88 of the control shaft 61 and width 128 (shown in FIG. 2k) of the pilot region 127 is sized to receive stepped portion 65. The dropouts 32a and 32b shown here are more typical of the front dropouts of a bicycle frame, but the rear dropouts may be similar in design and it is understood that this design is representative of a wide range of dropout designs, either conventional or unconventional.

The hub assembly 30 includes an axle assembly 24 (and also including axlecap 42), bearing assemblies 33a and 33b, and hub shell 20. In this case, the axle assembly 24 is generally stationary and fixed to the frame of the bicycle, while the hub shell 20 is rotatable about axial axis 28 and about the axle assembly 24 by means of bearing assemblies 33a and 33b. Bearing assemblies 33a, and 33b are shown here as conventional "cartridge" type bearing assemblies, including rolling elements, an inner race and an outer race. The hub shell 20 includes two hub flanges 22a and 22b that are adapted to connect with the first ends of spokes (not shown) in the conventional manner. Hub shell 20 includes a second end portion 25 axially disposed to be proximal to handle 66 of the control shaft assembly 60 and to outer face 46b, and a first end portion 26 axially disposed to be distal the handle 66 relative to the second end portion 25 and to be axially proximal outer face 46a. The axle assembly 24 includes axlecap 42, axlecap 44, sleeve 58, and control shaft assembly 60. The control shaft assembly 60 includes the control shaft 61 with spring 97, snaprings 64b and 64c, handle 66, and pivot pin 67. The handle 66 includes radially projecting lever portions 45a and 45b to afford additional tightening torque and leverage when the handle 66 is manipulated by the operator. The handle 66 also includes a pivot tab 69 with a hole 101 therethrough. The sleeve 58 includes an axial opening 78 therethrough with a shoulder 41, and with internal threads 79. Sleeve 58 also includes end face 77, shoulder 80, collar 82, and hole 83 that is sized to accept and preferably to pilot the control shaft 61.

Concentric and coaxial within the sleeve 58 is the control shaft 61, which is both (axially) slidable and rotatable within the sleeve 58 about the axial axis 28. Control shaft 61 includes a shank portion 88 and an enlarged head portion 89, with a grip face 73 serving as a transition surface between shank portion 88 and head portion 89. The shank portion 88 extends axially inwardly from the grip face 73 and includes a cylindrical stepped portion 65 of larger diameter 131 and a shank portion 88 that is concentric with stepped portion 65 and is of smaller diameter 135 such that there is a step or transition surface 75 therebetween. The shank portion 88 may be considered as a radially relieved surface relative to the stepped portion 65 and the stepped portion 65 may be considered as a radially enlarged surface relative to the shank portion 88. The shank portion 88 includes end face 199, and external threads 62 at its engagement end adjacent end portion 99. End face 199 and transition surface 75, which correspond to first and second leading engagement edges of the control shaft 61 respectively, are axially separated by engagement distance 198. The head portion 89, including grip face 73, extends axially outwardly from the grip face 73 and includes a slot 90 to accept the pivot tab 69 of the handle 66, and a cross hole 71 sized to accept the pivot pin 67. Control shaft 61 extends through axlecaps 42 and 44 and sleeve 58 and includes end portion 99 with external threads 62 at its engagement end. Control shaft 61 further includes snaprings 64b and 64c, each nested and engaged in corresponding circumferential snapring grooves, at specific axial locations along its length. Snapring 64b provides an axial end stop for compression spring 97, which is positioned between snapring 64b and end face 70, and which serves to axially bias the control shaft assembly 60 in direction 121 relative to the sleeve 58. Snapring 64c serves to provide an axial travel limit stop for the control shaft assembly 60 relative to the axlecap 44 and to retain the control shaft assembly 60 to the rest of the hub assembly 30.

Axlecap 44 includes outer face 46b, shoulder 55, counterbore 48, collar portion 56, cylindrical alignment surface 43b, end face 70, and an axially extending hole 54 therethrough. Axlecap 44 also includes flats 81 for rotational manipulation with a wrench (not shown). Collar portion 56 includes a threaded portion with external threads 57 to mate with internal threads 68 of the sleeve 58 and a smooth cylindrical portion 63 to pilot the inside diameter of bearing 33b. The diameter 49 of counterbore 48 is sized to receive stepped portion 65.

Axlecap 42 includes end face 46a, face 47, cylindrical alignment surface 43a, and an axially extending hole 50 sized to accept collar 82. Outer faces 46a and 46b are generally axially opposed and face away from each other and preferably have a fixed axial distance 39. Holes 50 and 54 constitute the exposed openings of a continuous axial hole that extends through the sleeve 58 to accept the control shaft 61.

Adapter 100 is also detailed in FIG. 2n and includes externally threaded collar 102, flats 105, axial hole 104, shoulder 108, end face 103, and a concave alignment surface 106. Collar 102 includes external threads 143 for threadable assembly with nut 110. Hole 104 includes a counterbore 109 portion that extends axially outwardly from end face 103 through a portion of hole 104 by depth 113 (FIG. 2g) and is of a diameter sized to accept the major diameter of external threads 62 of the control shaft 61. Hole 104 also includes an internally threaded portion with internal threads 107 extending axially from the base of the counterbore 109 axially outwardly through the remainder of the collar 102. Internal threads 107 are sized to threadably mate with external threads 62 of the control shaft 61. Flats 105 create a noncircular profile and are sized to engage and key with the sidewalls 111 of slot 36a and serve to prevent the adapter 100 from rotating about the axial axis 28. Flats 105 also serve to prevent the adapter 100 from rotating relative to the nut 110 during assembly with dropout 32a and also to maintain the desired orientation (about the axial axis 28) of the adapter 100. The engagement between flats 105 and slot 36a also serve to maintain the proper alignment of the adapter 100 about the axial axis 28. Nut 110 includes internally threaded hole 112, end face 114, and flats 116.

The adapter 100 is first pre-assembled to dropout 32b such that collar 102 and flats 105 are nested within slot 36a to extend therein, with shoulder 108 axially abutting inboard face 38a. Flats 105 are aligned and keyed with sidewalls 111 of the slot 36a. Nut 110 is then threaded onto adapter 100 with internal threads 143 of hole 112 threadably mated to external threads of collar 102, such that end face 114 is axially abutting outboard face 40a. The nut 110 is then further threadably tightened against the adapter 100, by means of a wrench (not shown) engaged to flats 116 to sandwich, clamp, and grip the dropout 32a, with end face 114 bearing and gripping against outboard face 40a and shoulder 108 bearing and gripping against inboard face 38a. The keyed engagement between flats 105 and sidewalls 111 prevents the adapter 100 from rotating while the nut 110 is tightened and also maintains the desired alignment of the adapter 100 relative to the dropout 32a, insuring that other features, such as the alignment surface 106, is in proper alignment to receive the hub assembly 30. This rotatably fixed engagement also insures that the adapter 100 will not spin about the axial axis 28 when the external threads 62 are threadably mated with internal threads 107. End face 103 is axially spaced from inboard face 38b by frame spacing distance 35 that corresponds to the axial hub spacing distance 39 between outer faces 46a and 46b.

As shown in FIG. 2b, which details the hub assembly 30 and corresponds to the retracted position of the control shaft assembly 60, shoulder 80 axially abuts the inner race of bearing assembly 33a and end face 77 axially abuts the inner race of bearing assembly 33b. Outer races of bearing assemblies 33a and 33b are radially and axially fixed in the hub shell 20 in the conventional manner as shown. Thus, sleeve 58 is axially fixed relative to the hub shell 20, with the hub shell 20 rotatable about the sleeve 58 via bearings 33a and 33b about the axial axis 28. Axlecap 44 is threadably assembled to the sleeve 58 as shown, with external threads 57 mated to internal threads 79 and with shoulder 55 axially abutting the inner race of bearing assembly 33b. End face 77 and shoulder 55 serve to axially sandwich and locate the inner race of bearing assembly 33b. Collar portion 56 extends through the inner race of bearing assembly 33b. Similarly, collar 82 extends through the inner race of bearing 33a and within hole 50 to also pilot the axle cap 42. Shoulder 80 and face 47 serve to axially sandwich and locate the inner bearing race of bearing assembly 33a. The opening 78 of sleeve 58 is stepped from a larger diameter adjacent the end face 77 for clearance with spring 97 to the smaller diameter of hole 83 adjacent the collar 82 for radial piloting of the control shaft 61. Sleeve 58 also includes notches 86 at the engagement end for rotational manipulation with a mating wrench (not shown) about the axial axis 28. The assembled axle assembly 24 preferably provides a fixed axial distance between outer faces 46a and 46b as is conventional.

Snapring 64c provides an axial displacement limit stop relative to the axle assembly 24. In the case where the control shaft assembly 60 is withdrawn too far in direction 118, the snapring 64c will abut end face 70 (as shown in FIG. 2b) and limit its travel. As such, snapring 64c also serves to insure that the control shaft 61 is positively retained with the axle assembly 24, serving as a convenience to prevent the control shaft assembly 60 from becoming separated from the hub assembly 30. The control shaft 61 also includes head portion 89 with grip face 73, slot 90, and cross hole 71. The pivot tab 69 of the handle 66 is assembled to the head portion 89 by first inserting pivot tab 69 into slot 90 and then inserting pivot pin 67 through cross hole 71 such that the handle 66 is engaged to the head portion 89 in a clevis hinge arrangement. The handle 66 may now be pivoted about the pivot axis 72 relative to the control shaft 61.

For explanation purposes and referring to FIGS. 2a-b, it is understood that an orientation described as "clamp end" or "handle end" refers to an axial location proximal to the handle 66 and distal the end portion 99. Conversely, an orientation described as "toward the engagement end" or "engagement end" refers to an axial location proximal to the end portion 99 and distal the handle 66. The handle end may also be termed the "control end".

FIG. 2b shows the assembled hub assembly 30, with the handle 66 assembled to the control shaft 61 by means of pin 67. The handle 66 is shown to be pivoted to its open or unfolded position to facilitate its manual manipulation. Control shaft 61 is extending through hole 54 and spring 97 is axially constrained between end face 70 and snapring 64b. Axlecap 44 is threadably assembled to the sleeve 58 as described above. This threadable assembly may be threadably tightened with the aid of wrenches (not shown) engaged with flats 81 and with notches 86 to axially sandwich the inner race of bearing assembly 33b. A portion of collar 82 protrudes through bearing 33a to axially overlap and radially pilot the hole 50 of axlecap 42, with o-ring 87 providing a frictionally gripped retaining means therebetween in the conventional manner.

The compression spring 97 surrounds the control shaft 61, with its ends constrained and abutting the snapring 64b of the control shaft 61 and the end face 70 of the axlecap 44. With the control shaft assembly 60 in the retracted position, as shown in FIGS. 2b-c, the compression spring 97 is axially compressed and pre-loaded to provide a bias force to axially shuttle the control shaft assembly 60 in direction 121 towards its extended position as shown in FIGS. 2e and 2i. The term "axial shuttle" refers to an axial displacement that may or may not include rotation about the axial axis 28.

The control shaft 61 is shown in FIGS. 2b-c to be in the axially retracted position relative to the sleeve 58 and axle assembly 24. The control shaft assembly 60 has been axially withdrawn toward the handle end in direction 118 (the "retracted direction") until snapring 64c contacts the end face 70. This retracted position causes the spring 97 to be compressed to axially bias the control shaft assembly 60 in direction 121. In this retracted position, the axial gap 98 between outer face 46b and grip face 73 is considered "open" and there is axial clearance 147 (shown in FIG. 2g) between outboard face 40b and transition surface 75 adjacent the handle end. Additionally, in this retracted position, the end face 199 of the control shaft 61 may be flush or slightly axially inwardly recessed by recess distance 148 relative to the outer face 46a as shown. It is preferred that axial clearance 147 is equal or close to the recess distance 148 so that the end portion 99 is axially disengaged from the counterbore 109 by the same or similar amount as the transition surface 75 is disengaged from the pilot region 127.

FIG. 2c shows adapter 100 and nut 110 as firmly assembled to grip the left dropout 32a as described hereinabove. Once firmly secured to the dropout 32a, the adapter 100 may be considered as an extension of the dropout 32a. The hub assembly 30 is shown positioned prior to its assembly with the dropout 32b and adapter 100. The handle 66 is in its unfolded and open position. The operator has pulled the handle 66 in direction 118 to insure that the control shaft assembly 60 is in the retracted position with gap 98 open and expanded to provide the axial clearance 147 (FIG. 2g) and with the end portion 99 correspondingly retracted to provide the recess distance 148 to permit the hub assembly 30 to be radially assembled to dropouts 32a (including adapter 100 fixed thereto) and 32b. As such, the transition surface 75 is preferably axially aligned to be axially coincident or axially outboard of the outer face 40b such that the shank portion 88 is axially aligned with open slot 36b. Outer face 46a is also generally axially aligned with end face 103 and outer face 46b is generally axially aligned with inboard face 38b. Shank portion 88 is aligned with necked entrance region 126 and alignment surfaces 43a and 43b are aligned with respective alignment surfaces 106 and 129.

The radially position engagement between alignment surfaces 43a and 43b and respective alignment surfaces 106 and 129 is provided as a convenience to center and radially pre-align the control shaft 61 with hole 104 and pilot portion 127 respectively. This pre-alignment may serve to permit the smooth and unrestricted axial shuttling and circumferential rotation of the control shaft 61 during the assembly and disassembly of the hub assembly 30 with the dropouts 32a and 32b as described herein. Alternatively, other geometries and/or arrangements may be utilized to provide this radial pre-alignment. In the absence of such a pre-alignment engagement, the control shaft may bear directly against the dropouts 32a and 32b, which may result in binding and friction therebetween, which could impede the smooth and unrestricted axial shuttling and circumferential rotation of the control shaft 61.

The handle 66 serves to provide geometry for the operator to easily manipulate and control the control shaft assembly 60 as described herein. As a convenience and to prevent the operator from retracting the control shaft assembly 60 too far in direction 118, snapring 64c is provided to bear against the end face 70 of the axlecap 44 as a positive axial travel limit stop. It is noted that, as shown in FIGS. 2a-n, the control shaft assembly 60 is axially retained and engaged to the hub assembly 30 such that the control shaft assembly 60 may not be inadvertently removed from the hub assembly 30.

Next, as shown in FIGS. 2d and 2g, the hub assembly 30 is moved in the generally radial direction 120 relative to the dropouts 32a and 32b such that alignment surface 43a is radially abutting and nested with alignment surface 106 and alignment surface 43b is radially abutting and nested with alignment surface 129 to provide radial alignment between the hub assembly 30 and dropouts 32a and 32b. These nested engagements serve to provide a radial depth stop of the hub assembly 30 relative to the dropouts 32a and 32b in the conventional manner. Outer face 46a is also adjoining end face 103 while outer face 46b is also adjoining inboard face 38b to provide axial alignment between the hub assembly 30 and dropouts 32a and 32b. The external threads 62 are now radially aligned with counterbore 109 and the stepped portion 65 is now radially aligned with pilot region 127.

Next, as shown in FIG. 2h, the operator has manually released the handle 66, allowing the spring 97 to linearly displace and shuttle the control shaft assembly 60 in direction 121 (the "extending direction") to advance the control shaft assembly 60 into the "pre-engaged position" such that the end portion 99 and end face 199 is now protruding axially outwardly from outer face 46a to axially overlap counterbore 109 by overlap distance 117. Counterbore 109 circumscribes end portion 99, such that end portion 99 is thus radially retained and engaged with the left dropout 32a. Simultaneously, in this pre-engaged position, the transition surface 75 and a portion of the stepped portion 65 is now axially overlapping the counterbore 109 by overlap distance 125. Collar portion 65 is now radially retained and engaged with the dropout 32b. It may be considered that counterbore 109 and pilot region 127 both include retaining surfaces that serve to radially retain the hub assembly 30 to the dropouts 32a and 32b. It may also be considered that end portion 99 and collar portion 65 may both be considered as having retaining surfaces that serve to radially engage with their respective mating engagement surfaces. End portion 99 and stepped portion 65 may be considered as the leading edges of engagement surfaces the control shaft 61 that are axially spaced corresponding to distance 198. As the control shaft 61 is axially shuttled, both of these engagement surfaces are simultaneously shuttled.

As the control shaft assembly 60 is axially shuttled as described, it may be preferable that this axial overlap 117 of portion 99 be generally equal to the axial overlap 125 of the transition surface 75 so that both of these radial engagements are initiated generally simultaneously during this assembly sequence described herein. This also insures that these two radial engagements will release generally simultaneously during disassembly of the hub assembly 30 from the dropouts 32a and 32b Similarly, it may be preferable that hub spacing distance 197 is equal to or nearly equal to engagement distance 198 such that, as control shaft 60 is axially shuttled in direction 121, the radial overlie engagements between end portion 99 and counterbore 109 and between collar portion 65 and pilot region 127 are initiated simultaneously or nearly simultaneously.

Due to tolerances and design restrictions, it may not be possible to insure that distances 117 and 125 are absolutely equal. However, if distances 117 and 125 are within 3 millimeters or, more preferably, within 1 millimeter of each other, the control shaft assembly 60 will still be considered to have simultaneous radial engagement initiation and simultaneous radial release initiation from dropouts 32a and 32b. By coordinating and axially "timing" these two axial overlap distances 117 and 125, the radial engagement of both the handle end and the engagement end will initiate simultaneously as the control shaft assembly 60 is axially shuttled in direction 121. This reduces the possibility that the hub assembly 30 will not hang up or become misaligned as it is installed and/or removed from the dropouts 32a and 32b.

This simultaneous initiation of both of these overlie engagements causes both the control end and handle end of the control shaft assembly 60 to be optimally radially piloted and pre-engaged so that, once the pre-engagement position is initiated (by simply manually releasing the spring-loaded control shaft assembly 60), the control shaft 61 maintains its coaxial alignment such that the external threads 62 are properly aligned with internal threads 107 and the stepped portion 65 is properly aligned with the pilot region 127. Further, these two overlie engagements, which are also maintained and supported by the axial preload provided by the spring 97, provide a significant safety feature and insure that the hub assembly 30 will not become inadvertently separated or dislodged from the dropouts 32a and 32b, even if the threadable engagement between internal threads 109 and external threads 62 is not initiated. Also, outer faces 46a and 46b are now closely located between end face 103 and inboard face 38b for axial engagement between the hub assembly 30 and the dropouts 32a and 32b. The hub assembly 30 is thus also loosely retained to the dropouts 32a and 32b.

If the axial overlap 117 is significantly greater than the axial overlap 125, then the radial overlie engagement between the end portion 99 and the counterbore 109 will be axially initiated prior to the radial overlie engagement between the stepped portion 65 and the pilot region 127. Thus, during this instant, the handle end of the control shaft assembly 60 is not radially retained and may be radially displaced and offset while the end portion 99 remains radially piloted and aligned within the counterbore 109. This may allow the control shaft assembly 60 to become cocked and misaligned such that the threaded engagement between external threads 62 and internal threads 107 may also be misaligned, causing cross-threading and/or damage to the control shaft 61 and/or the adapter 100. Further, with only one overlie engagement, the safety benefit of the pre-engagement is significantly compromised and possibly defeated. Similarly, if the axial overlap 125 is significantly greater than the axial overlap 117, then the radial overlie engagement between the stepped portion 65 and the pilot region 127 will be axially initiated prior to the radial overlie engagement between the end portion 99 and the counterbore 109. Thus, during this instant, the end portion 99 of the control shaft assembly 60 is not radially retained and may be radially displaced and offset while the stepped portion 65 remains radially piloted and aligned within the pilot region 127. This may allow the control shaft assembly 60 to become cocked and misaligned such that the stepped portion 65 may bind against the pilot region 127, adversely affecting the easy assembly of the hub assembly 30 with the dropouts 32a and 32b and possibly damaging the control shaft 61 and/or dropout 32b.

Next, as shown in FIG. 2e, the operator may then manually rotate the handle 66 in direction 122, which serves to threadbly engage external threads 62 with internal threads 107 and also to advance the control shaft assembly 60 further in direction 121, serving to reduce gap 98 until grip face 73 axially abuts outboard face 40b. Outer face 46a is abutting end face 103 and outer face 46b is abutting inboard face 38b and the control shaft assembly 60 is in the engaged position. With the handle 66 in the open position as shown, the lever portions 45a and 45b may function as the "wings" of a wingnut to provide coupled manual leverage amplification for rotation of the control shaft assembly 60 about the axial axis 28. Further threadable tightening of the handle 66 in direction 122 serves to axially draw end face 103 toward grip face 73, thereby firmly clamping dropout 32b between grip face 73 and outer face 46b and firmly clamping outer face 46a against end face 103. The end portion 99 is now fully axially overlapping the adapter 100 and the stepped portion 65 is now fully axially overlapping the dropout 32b to more positively radially retain the hub assembly 30 to the dropouts 32a and 32b. With the handle 66 fully tightened as described above, the hub assembly 30 is now in the clamped position relative to dropouts 32a and 32b and the hub assembly 30 is firmly clamped and installed with the dropouts 32a ad 32b.

The stepped portion 65 is now axially overlapping the dropout 32b by distance 125' to more completely axially overlap pilot region 127 to be further radially retained and engaged with the dropout 32b. Similarly, the end portion 99 is axially overlapping the adapter 100 by distance 117' to be further radially retained and engaged with the dropout 32a. The radial retaining afforded by axial overlap distances 117' and 125' provide an added measure of safety in insuring that the hub assembly 30 remains engaged to the dropouts 32a and 32b even if the control shaft assembly 60 was threadably loosened slightly such that the axially gripping of the dropout 32b were inadvertently reduced.

Next, as shown in FIGS. 2f and 2i, the handle 66 may next be folded and pivoted about pin 67 and pivot axis 72 in direction 123 to its "closed" position to reduce the overall axial width 124 of the hub assembly 30 and to create a more aerodynamic and compact aesthetic appearance, while also reducing the propensity for inadvertent snagging on external objects. While the capability to fold handle 66 as described herein is not a requirement for proper function of this embodiment, it serves to provide the convenience of a lower profile assembly, as preferred by many cyclists.

The procedure for uninstallation and removal of the hub assembly 30 from the dropouts 32a and 32b is basically the reverse of the assembly and installation sequence just described. For removal, the handle 66 is first unfolded to the position shown in FIG. 2e. Next, the control shaft assembly 60 is unscrewed, in a direction opposite to direction 122, via handle 66 until the external threads 62 are disengaged from the internal threads 107, displacing the control shaft assembly 60 in direction 118 into the pre-assembled position shown in FIG. 2h. The handle 66 is then retracted and withdrawn in axial direction 118, against the preload of spring 97, to advance the control shaft in direction 118 until the snapring 64c is abutting end face 70. End face 199 is now axially coincident or inboard of end face 103 and transition surface 75 is axially coincident or outboard of outboard face 40b as shown in FIG. 2b. At this retracted position of the control shaft assembly 60, the end portion 99 is no longer axially overlapping the counterbore 109 and the stepped portion 65 is no longer axially overlapping the pilot portion 127 and the aforementioned radial engagements are released, permitting the hub assembly 30 to be radially removed from the frame opposite to direction 120 to complete the removal or uninstallation procedure. Since distances 117 and 125 are equal or nearly equal, the release of these two radial engagements are axially timed to initiate and occur generally simultaneously as mentioned hereinabove.

Note that, as the control shaft assembly 60 is retracted in direction 118 past the pre-assembled position, the end portion 99 is radially released from counterbore 109 simultaneous to the collar portion 65 being radially released from the pilot region 127. By coordinating these two axial overlap distances, the radial release of both the end portion 99 and the collar portion 65 will occur simultaneously as the control shaft assembly 60 is axially retracted in direction 118. This reduces the possibility that the hub assembly 30 will hang up adjacent either outer face 46a or 46b, allowing the hub assembly to be skewed or otherwise misaligned as it is removed or uninstalled from the dropouts 32a and 32b.

While the hub assembly 30 is retained to dropouts 32a and 32b with the control shaft assembly 60 in the pre-engaged position, this retained configuration normally serves as a convenience to maintain the axial alignment of the control shaft assembly 60 with respect to the dropouts 32a and 32b. The pre-engaged position also serves as a safety retaining means to restrict separation of the hub assembly 30 from the dropouts 32a and 32b in the event that the control shaft assembly 60 is inadvertently not placed in the clamped position. While the clamped position is not required to assemble the hub assembly 30 to the dropouts 32a and 32b, the threadable assembly associated with the clamped position is preferred and serves to fortify and solidify this assembly.

While the embodiment of FIGS. 2a-n shows the control shaft assembly 60 as biased by the compression spring 97 toward the extended position, it is envisioned that the control shaft assembly 60 may alternatively be biased toward the retracted position. For example, the compression spring 97 may instead be positioned between snapring 64b and shoulder 41 to bias the control shaft assembly 60 in direction 118. It should be noted that the spring-bias provided by spring 97 as described herein provides a convenience and is not a requisite for the proper functionality of the present invention.

In addition to being axially shuttled as described, the control shaft 61 has a generally smooth circular cylindrical surface such that, in both the extended and retracted positions, the control shaft assembly 60 may be rotated relative to the sleeve 58 about the axial axis 28. Such rotation is especially beneficial when attempting to threadably engage external threads 62 with internal threads 107. Meanwhile, adapter 100 is axially and rotationally fixed to the dropout 32a of the frame (not shown). Thus, the axially displaceable (in directions 118 and 121) control shaft assembly 60 of the hub assembly 30 is operative to selectively engage the dropout 32a. It is noted that the control shaft assembly 60 is freely rotatable at all points in its axial travel. This is a preferred feature, since the control shaft 61 must be rotatable to threadably assemble the external threads 62 with internal threads 107. In an alternative design, the control shaft assembly 60 may be rotatably keyed to the sleeve 58 or another portion of the axle assembly 24 about axial axis 28 or else the control shaft assembly 60 may employ a rotationally yieldable detent mechanism relative to the sleeve 58.

The combined assembly of the sleeve 58 and axlecaps 42 and 44 serve as an outer axle assembly that is discreet from the control shaft assembly 60. This outer axle assembly is axially fixed relative to the hub shell 20, while the control shaft assembly may be axially shuttled within this outer axle assembly. Alternatively, the components of the outer axle assembly may be omitted and the control shaft assembly may be axially shuttled within the bearings 33a and 33b.

FIG. 2j describes an alternate dropout 136 that may be substituted for the dropout 32a, the adapter 100, and the nut 110. Dropout 136 is a monolithic or an integral assembly that incorporates the geometry and features of the adapter 100. Dropout 136 includes hole 140, inboard face 142, and a concave alignment surface 138. Hole 140 includes a counterbore 144 portion that extends axially from inboard face 142 through a portion of hole 140 and is of a diameter sized to accept the major diameter of external threads 62 of the control shaft 61. Hole 140 also includes an internal thread 141 portion (obscured) extending axially outboard from the base of the counterbore 144 through the remainder of the dropout 136. Internal threads 141 are sized to threadably mate with external threads 62 of the control shaft 61.

As shown in FIG. 2a, dropout 32a is of a generally conventional "slotted" design and includes an open slot 36a to receive a conventional hub assembly (not shown). Adapter 100 and nut 110 are required to adapt dropout 32a to receive the hub assembly 30, as shown in FIG. 2c. Alternatively, dropout 136 may be substituted for the combined assembly of dropout 32a, adapter 100, and nut 110. As shown in FIG. 2j, dropout 136 is purpose-built to receive the hub assembly 30 and incorporates geometry and features otherwise included in the adapter 100. These geometries and features have similar functionality to the analogous geometries and features associated with the adapter 100 and as described herein. Dropout includes inboard face 142, which corresponds to inboard face 38a, and alignment surface 138, which corresponds to alignment surface 106, and hole 140 with internal threads 141 and counterbore 144, which corresponds to hole 104 with internal threads 107 and counterbore 109. Dropout 136 may thus be substituted for dropout 32 and adapter 100 and nut 110 to receive the hub assembly 30 as described in FIGS. 2c-e.

FIGS. 2L and 2m illustrate the interaction between the control shaft 61 and the dropout 32b in greater detail. For clarity and simplification of illustration, these two figures show only the dropout 32b and the control shaft 61, while the most of the other components of the hub assembly 30 are not shown here. FIG. 2L corresponds to the transition between the assembly sequence shown in FIG. 2c and FIG. 2d, with the shank portion 88 passing through the necked entrance region 126 of open slot 36b in direction 120. The shank portion 88 has a cross-sectional diameter 135 that is smaller and radially relieved relative to diameter 131. It may be seen that the slot width 37b is sized to let the shank portion 88 pass therethrough, however the slot width 37b is smaller than the diameter 131 of the stepped portion 65. As shown in FIG. 2m, the hub assembly 30 is further advanced in direction 120 until the alignment surface 43b is radially abutting and nested within alignment face 129 (as shown in FIG. 2g). The control shaft assembly 60 has been axially advanced in direction 121 until the stepped portion 65 is axially overlapping the pilot region 127, which corresponds to the assembly sequences of FIGS. 2e, 2f, 2h, and 2i. As illustrated in FIG. 2m, the stepped portion 65 has been axially shuttled to be positioned within the pilot region 127 of the open slot 36b. The diameter 131 of stepped portion 65 is sized to be larger than the width 37b of the necked entrance region 126 such that the control shaft 61 is now axially piloted and radially retained within the pilot region 127, thereby causing the hub assembly 30 to be radially retained with the dropout 32b and preventing the hub assembly 30 from becoming separated from the dropout 32b. FIG. 2m describes the interaction between the stepped portion 65 and the pilot region 127 in both the pre-engaged and engaged positions.

Finally, as shown in FIGS. 2f and 2i, the handle 66 may next be folded and pivoted about pin 67 and pivot axis 72 in direction 123 to its "closed" position to reduce the overall axial width 124 of the hub assembly 30 and to create a more aerodynamic and compact aesthetic appearance, while also and reducing the propensity for inadvertent snagging on external objects. While the capability to fold handle 66 as described herein is not a requirement for proper function of this embodiment, it serves to provide the convenience of a lower profile assembly, as preferred by many cyclists.

FIG. 2n further details the left dropout 32a, the adapter 100, the nut 110, and the control shaft 61 described in FIGS. 2a-i. Counterbore 109 is shown to have an axial depth 149 that corresponds to distance 117 of FIG. 2h. For clarity, many other parts of the hub assembly 30 are not shown in FIG. 2n, but it is understood that the complete hub assembly 30 is implied and is otherwise included.

While the alignment surfaces 106 and 129 provide a convenient circular cylindrical surface to nest with the circular cylindrical surface geometry of the alignment surfaces 43a and 43b and are shown here as a representative arrangement to radially position the hub assembly 30 with respect to the dropouts 32a and 32b. These alignment surfaces may alternatively have a wide range of alternate geometries, some of which may not be cylindrical. Some of these alternate geometries may create a rotationally keyed engagement with the axle assembly. As a further alternative, the alignment surfaces 106 and/or 129 may be eliminated entirely and the control shaft 61 may instead serve to provide the radial locating interface with dropouts 32a and/or 32b.

Figure 2O:
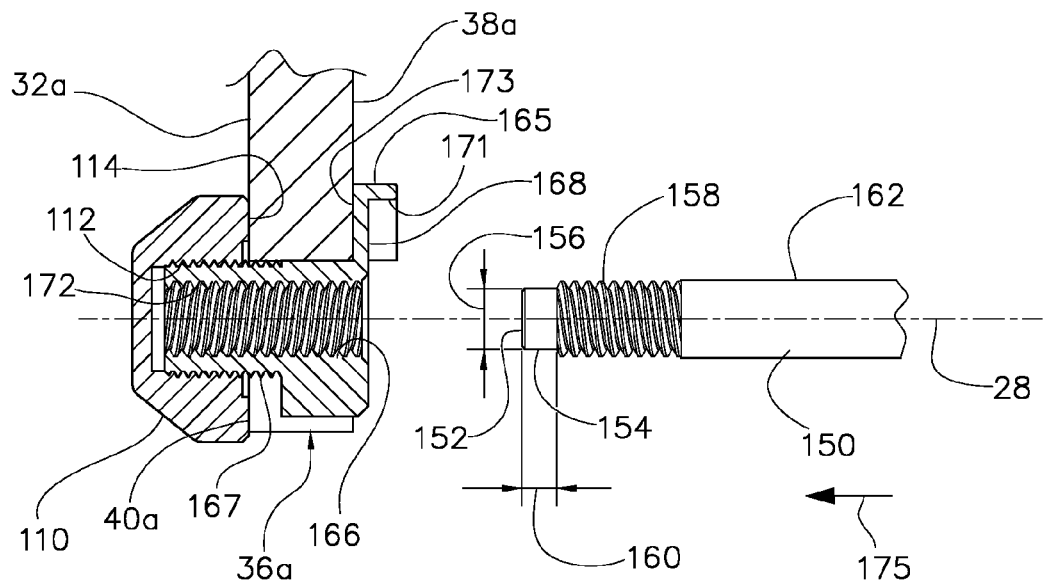
FIG. 2o is a cross sectional detail view corresponding to FIG. 2n, describing an alternate design where the counterbore is eliminated in favor of a pilot tip of the control shaft to provide piloting and pre-engagement of the control shaft with the threaded hole of the left dropout.

FIGS. 2a-n describe a design where the adapter 100 includes a counterbore 109 to radially retain the end portion 99 when the control shaft assembly 60 is in the pre-engaged position, as described in FIG. 2h. This counterbore also serves to pilot and align the end portion 99 prior to threadable engagement between external threads 62 and internal threads 107. Alternatively, the counterbore 109 may be eliminated in favor of a pilot tip 154 of the control shaft 150 to pilot and pre-engage the inside diameter of internal threads 172 as described in FIG. 2o. As shown in FIG. 2o, the control shaft 150 is identical to control shaft 61 except that the end portion 152 of the shank portion 162 includes an unthreaded pilot tip 154 of diameter 156 that projects axially outwardly from external threads 158 by axial length 160. Adapter 165 is identical to adapter 100 except that adapter 165 does not include a counterbore 109. Adapter 165 includes externally threaded collar 167, hole 166, shoulder 173, end face 168, and a concave alignment surface 171. Hole 166 includes internal threads 172 extending axially therethrough. Internal threads 172 are sized to threadably mate with external threads 158 of the control shaft 150. Nut 110 and dropout 32a are identical to those described in FIGS. 2a-n. For clarity, many other parts of the hub assembly 30 are not shown in FIG. 2o, but it is understood that the complete hub assembly 30 is implied and is otherwise included.

The diameter 156 of pilot tip 154 is sized to have clearance with the inside diameter of internal threads 172 such that, when the control shaft 150 is axially shuttled in direction 175 to achieve the pre-engaged position (as described in FIG. 2h), the pilot tip 154 will axially overlap the internal threads 172 such that the end portion 152 will be axially overlapping and radially retained to the adapter 165 in a manner similar in effect to that described in FIG. 2h. The control shaft 150 may then be threadably assembled to the adapter 100 as described in FIGS. 2e, 2f, and 2i. It is noted that a further alternate design may include both a pilot tip of the control shaft and a counterbore of the adapter to provide an axially overlapping and radially retained engagement therebetween when the control shaft is in the pre-engaged position.

The embodiment of FIGS. 3a-e describes a right dropout 180 that may be substituted for dropout 32b in FIGS. 2a-n. In this case, the stepped portion 65 is unnecessary and control shaft 201 is substituted for control shaft 61. All other components are generally identical to those shown in FIGS. 2a-n. For clarity, many other parts of the hub assembly 30, or the left dropout 32a are not shown in FIGS. 3a-e, but it is understood that the complete hub assembly 30 and dropout 32a is implied and is otherwise included.

Dropout 180, as detailed in FIGS. 3a-c, includes an axially outboard face 182, an axially inboard face 184, and an open slot 186 of width 187 with an entrance or opening 188 and a closed end 195. Inboard face 184 also includes an axially inwardly projecting alignment face 196 to provide radial positioning location of the alignment surface 43b of axlecap 44 as previously described in FIGS. 2a-n. Open slot 186 is shown to be a straight slot, as the pilot region 127 of the keyhole-shaped slot 36b (of FIGS. 2a-u) is unnecessary in lieu of the collar portion 189. Outboard face 182 includes a collar portion 189 that projects axially outwardly from the outboard face 182 by distance 190, and includes a circular collar opening 191 of diameter 192 that is sized to provide radial clearance to receive the head portion 204 of control shaft assembly 200. Collar portion 189 also includes a collar gap 193 adjacent the open slot 186, and an end face 197. The collar opening 191 includes retaining surfaces 194a and 194b to be circumferentially adjacent collar gap 193 and provide an overlie engagement with the head portion 204 to radially retain the control shaft assembly 200 with the dropout 180 in the pre-engaged and the clamped positions. As the collar opening 191 is axially offset from the open slot 186, this combined geometry may be considered as an axially stepped slot.

Figure 3D:
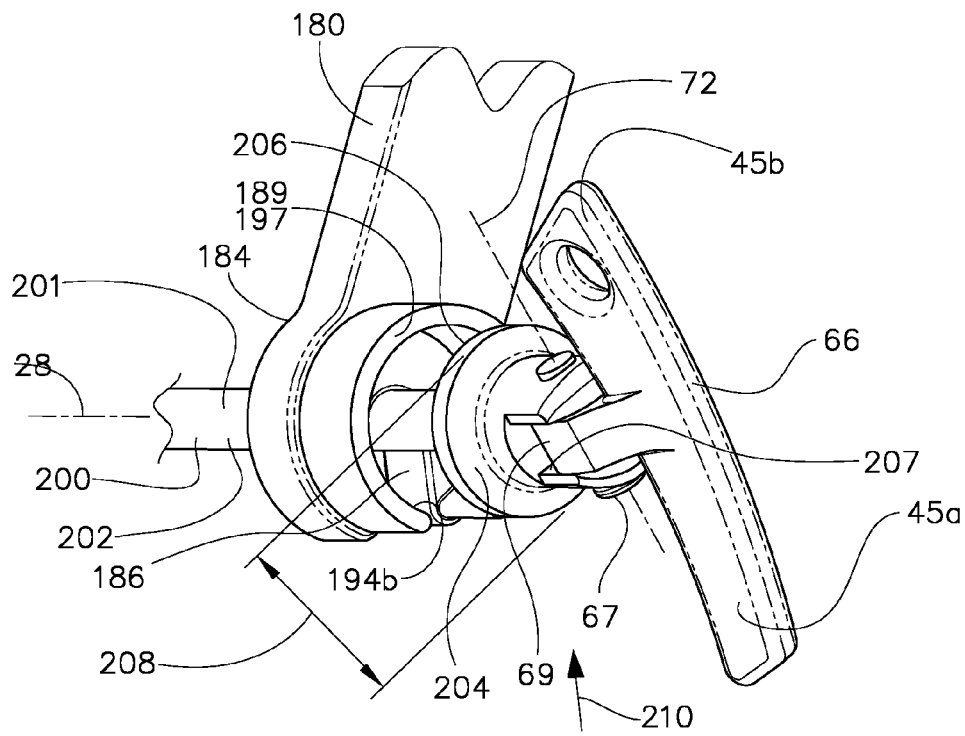
FIG. 3d is a partial perspective view of the embodiment of FIG. 3a, showing a control shaft positioned within the straight slot of the dropout, in an assembly sequence corresponding to FIG. 2d.
Figure 3E:
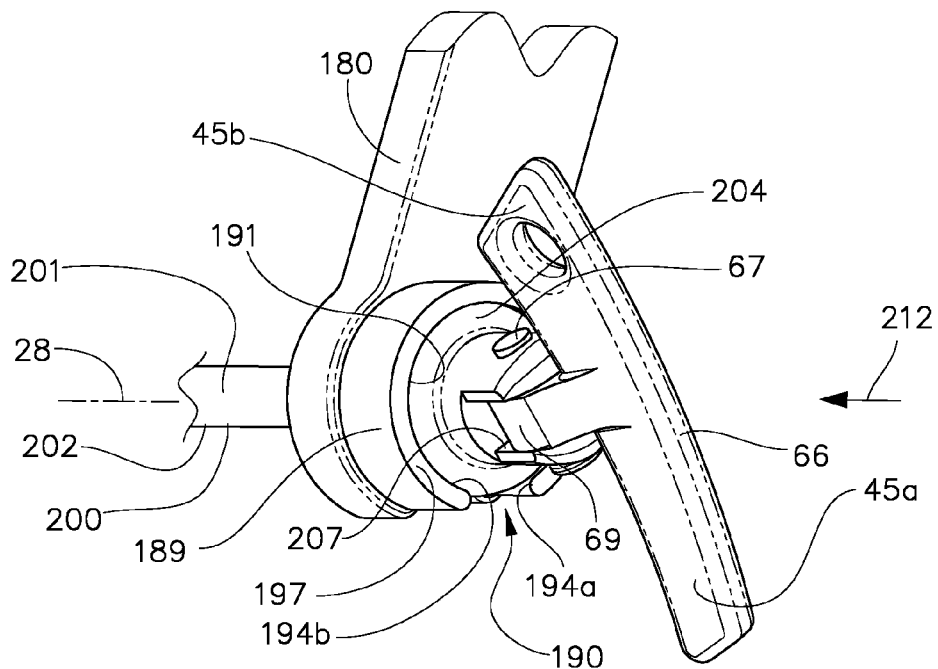
FIG. 3e is a partial perspective view of the embodiment of FIG. 3a, showing the control shaft positioned within the straight slot of the dropout, in a pre-engaged assembly sequence corresponding to FIG. 2h with the head portion positioned to axially overlap the retaining collar.

As shown in FIGS. 3d and 3e, control shaft assembly 200 includes a control shaft 201 with a head portion 204 and a shank portion 202, a handle 66, and a pivot pin 67. Handle 66 and pivot pin 67 are identical to those shown in FIGS. 2a-n. Head portion 204 is of diameter 208, and includes grip face 206 and slot 207 to interface with the handle 66 and pivot pin 67 in a manner identical to that described in FIGS. 2a-n.

FIG. 3d shows the control shaft assembly 200 in the retracted position such that the grip face 206 is axially coincident or outboard of end face 197 to provide axial clearance therebetween such that the hub assembly (not shown) may be radially presented to the dropout 180 in direction 210 such that shank portion 202 may pass radially through open slot 186 and collar gap 193 while the head portion 204 is axially outboard of end face 197 to clear past collar portion 189. FIG. 3d shows an assembly sequence corresponding to that of FIGS. 2d and 2g, where the alignment surface 43b (obscured) is radially abutting and nested with alignment face 196 and the shank portion 202 is positioned within open slot 186.

Figure 3F:
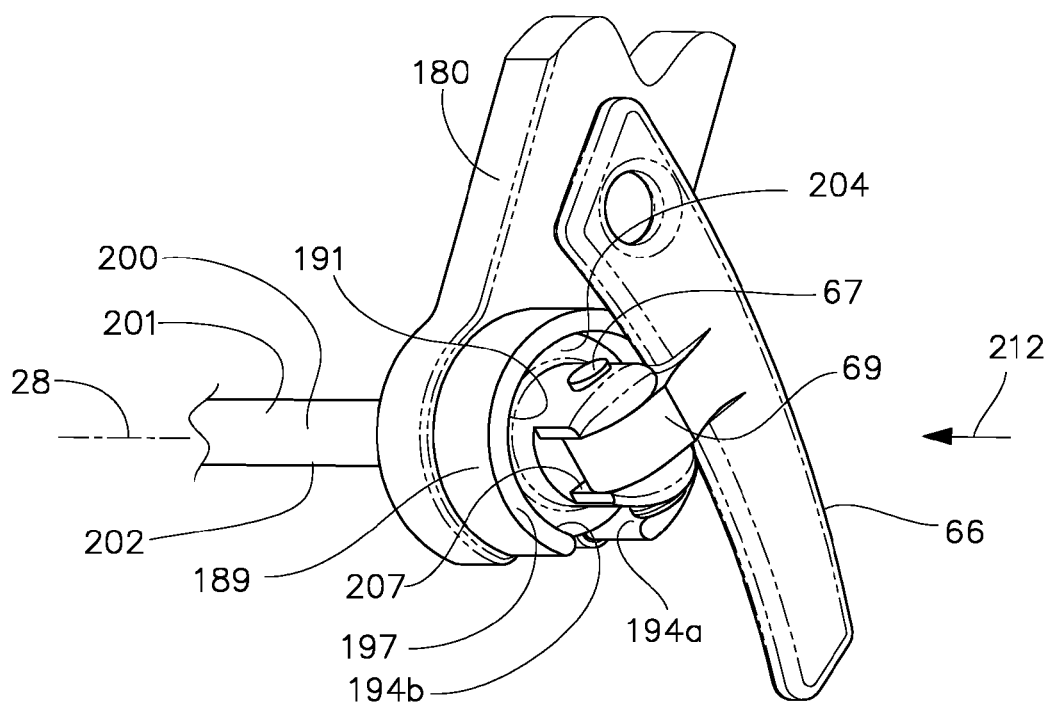
FIG. 3f is a partial perspective view of the embodiment of FIG. 3a, showing the control shaft positioned within the straight slot of the dropout, in an engaged assembly sequence corresponding to FIG. 2i with the control shaft assembly threadably tightened with the adapter.

FIG. 3e shows the control shaft in the pre-assembled and/or the pre-engaged position corresponding to FIG. 2h. The control shaft assembly 200 is next axially displaced in direction 212 such that the head portion 204 is axially overlapping the collar portion 189 and the hub assembly is in the pre-engaged position. The retaining surfaces 194a and 194b serve to provide an axial overapping engagement with the head portion 204 to radially retain the handle end of the control shaft assembly 200 to the dropout 180. Next, as shown in FIG. 3f, the control shaft assembly 200 is threadably assembled to dropout 32a (not shown) and further advanced in direction 212 to the engaged and clamped position, corresponding to FIGS. 2f and 2i, with the head portion 204 further axially overlapping the collar portion 189. The radial piloting engagement between the head portion 204 and the collar portion 189 is maintained throughout the transition between the pre-engaged position and the engaged position.

It may be viewed that the exemplary collar portion 189 serves to radially retain the head portion 204 at a radial overlie engagement that is generally located axially outboard of the grip face 206. This is in contrast to the embodiment of FIGS. 2a-n where the pilot portion 127 serves to radially retain the stepped portion 65 at a radial overlie engagement that is generally located axially inboard of the grip face 73. Head portion 204 and stepped portion 65 may be considered as radially enlarged portions relative to shank portions 202 and 88 respectively. Further, in the pre-engaged and the clamped positions, head portion 204 and stepped portion 65 are shown to be axially piloted and radially engaged to collar opening 191 and pilot region 127 respectively.

Figure 4A:
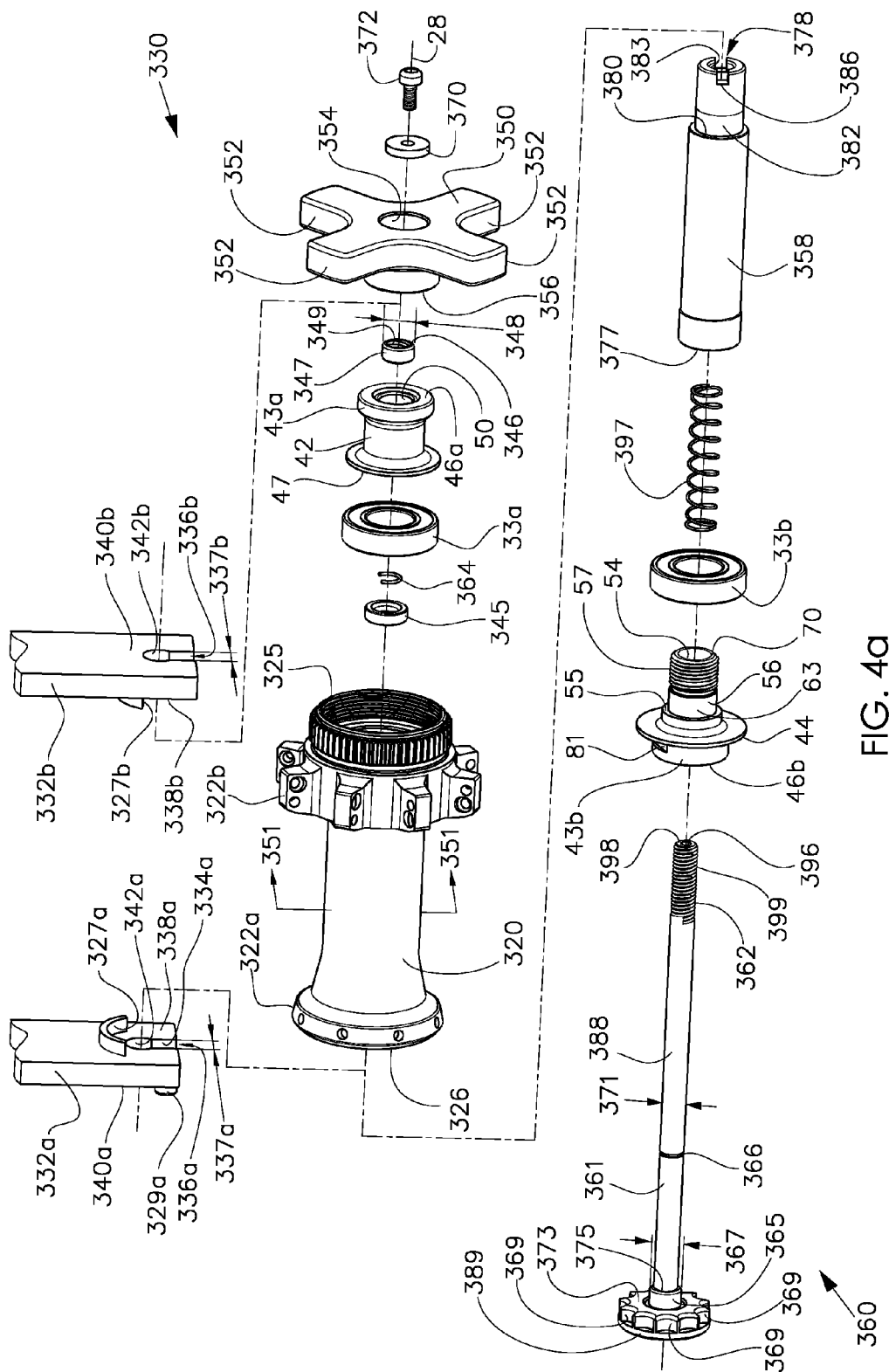
FIG. 4a is an exploded perspective view of a second embodiment of the present invention, showing the dropouts of the bicycle frame and a hub assembly, including a control shaft assembly.

FIGS. 4a-i describe another embodiment of the present invention where the control shaft assembly 360 has an axial overlying radial engagement with both dropouts 332a and 332b that engages and releases simultaneously. The control shaft 360 may also be axially contracted and expanded by means of a threadable engagement to axially clamp and lock the hub assembly 330 to the dropouts 332a and 332b. FIG. 4a is an exploded view, showing the individual components of this embodiment.

Figure 4B:
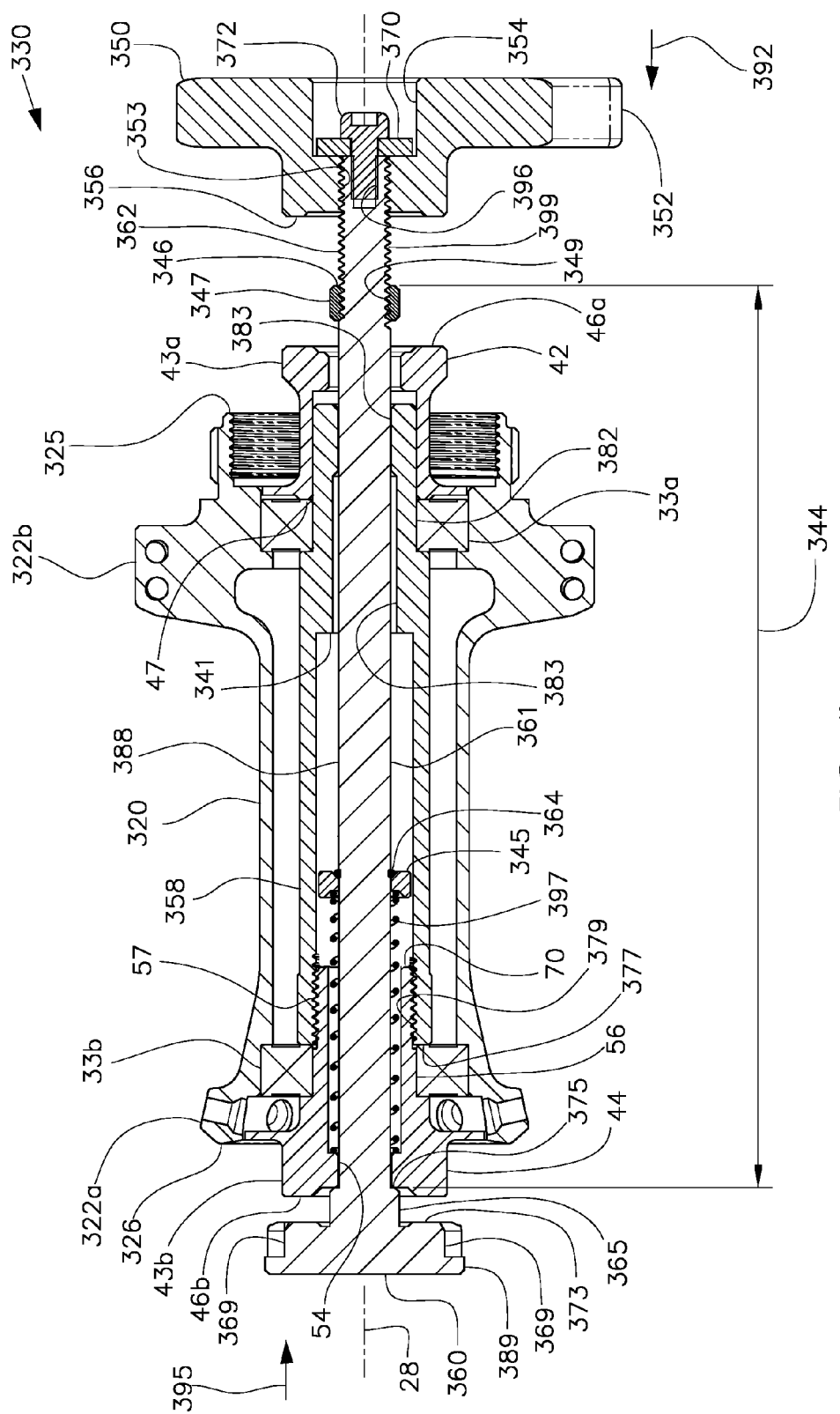
FIG. 4b is an axial cross-sectional view taken along 351-351 of the hub assembly of the embodiment of FIG. 4a, shown with the control shaft axially biased by the spring to a hyper-extended position such that the engagement end is axially outward beyond the extended position and with the knob in the open position.

Referring to FIGS. 4a and 4b, dropouts 332a (left dropout) and 332b (right dropout) may be considered mounting portions of the bicycle (not shown) and constitute the portion of the frame (not shown) to which the hub assembly 330 is mounted or connected. Right dropout 332b is schematically identical to dropout 32b of FIGS. 2a-n. Dropouts 332a and 332b similarly include respective open keyhole slots 336a and 336b that are stepped to include narrower necked entrance regions 334a and 334b of radial widths 337a and 337b that are sized to receive shank portion 388 and wider enlarged circular pilot regions 342a and 342b, each of greater radial width 337a and 337b that are sized to receive stepped portion 365 and step collar respectively. Dropouts 332a and 332b also include respective axially inboard faces 338a and 338b with an axially inwardly projecting alignment faces 327a and 327b, and axially outboard faces 340a and 340b. Dropout 332a also includes key projections 329a, 329b, and 329c extending axially outwardly from outboard face 340a. Alignment faces 327a and 327b provide radial positioning alignment of the alignment surface 43b of axlecap 44 and alignment surface 43a of axlecap 42 respectively. Open keyhole slots 336a and 336b each have a radially extending open entrance to receive the control shaft assembly 360. Inboard faces 338a and 338b are axially opposed and face each other, and are spaced by distance 343 (FIG. 4f) that corresponds to the fixed axial distance 339 (FIG. 4f) between outer faces 46a and 46b. Outer faces 340a and 40b are axially opposed and face away from each other. Widths 337a and 337b of necked entrance regions 334a and 34 are sized to receive the shank portion 388 while the corresponding radial widths of pilot regions 342a and 342b are sized to receive stepped portion 65 and step sleeve 347 respectively in a manner similar to that described in FIGS. 2L-m. The dropouts 332a and 332b shown here are more typical of the front dropouts of a bicycle frame, but the rear dropouts may be similar in design and it is understood that this design is representative of a wide range of dropout designs, either conventional or unconventional.

The hub assembly 330 includes an axle assembly 324 (comprised of axlecaps 42 and 44 and sleeve 358), bearing assemblies 33a and 33b, control shaft assembly 360, and hub shell 320. In this case, the axle assembly 324 is generally stationary and fixed to the frame of the bicycle, while the hub shell 320 is rotatable about axial axis 28 and about the axle assembly 324 by means of bearing assemblies 33a and 33b. Bearing assemblies 33a and 33b, spring 397, and axlecaps 42 and 44 are identical to those described in FIGS. 2a-n. The hub shell 320 includes two hub flanges 322a and 322b that are adapted to connect with the first ends of spokes (not shown) in the conventional manner. Hub shell 320 includes a second end portion 325 axially disposed to be proximal to knob 350 of the control shaft assembly 360 and to outer face 46b, and a first end portion 326 axially disposed to be distal the knob 350 and to be axially proximal outer face 46b. The control shaft assembly 360 includes the control shaft 361 with spring 397, snapring 364, knob 350, screw 372, washer 370, step sleeve 347, and step washer 345. The handle or knob 350 includes grip face 356, counterbore 354, internally threaded hole 353 to threadably mate with external threads 362 and radially projecting grip portions 352 to afford additional tightening torque and leverage when the knob 350 is manipulated by the operator. Grip portions 352 are representative of a wide range of noncircular geometries that may be provided to facilitate manual manipulation of the knob 350. Alternative noncircular geometries include a hex socket, wrench flats, knurled surface, among others. Step sleeve 347 includes an internally threaded hole 349, end face 346, and outside diameter 348, which is sized to assemble with pilot portion 342b.

The sleeve 358 includes an axial opening 378 therethrough with a shoulder 341, and with internal threads 379 and end face 377. Sleeve 358 also includes shoulder 380, collar 382, hole 383 at its handle end that is sized to accept the control shaft 361, and notches 386 for rotational manipulation with a mating wrench (not shown) about the axial axis 28.

Concentric and coaxial within the sleeve 358 is the control shaft 361, which is both (axially) slideable and (circumferentially) rotatable within the sleeve 358 about the axial axis 28. Control shaft 361 includes a shank portion 388 and an enlarged head portion 389 with key notches 369 circumferentially spaced around its perimeter and with a grip face 373 serving as a transition face between shank portion 388 and head portion 389. The shank portion 388 extends axially inwardly from the grip face 373 and includes a stepped portion 365 of diameter 367 that is larger than the smaller diameter 371 of shank portion 388 such that there is a step or transition surface 375 therebetween. The shank portion 388 and end portion 399 may be considered as a radially relieved surfaces relative to the stepped portion 365 and the stepped portion 365 may correspondingly be considered as an enlarged surface relative to the shank portion 388 and end portion 399. The shank portion 388 includes a circumferential snapring 364 nested in a mating circumferential groove, end face 398, external threads 362 at its engagement end which is proximal and adjacent end portion 399, and internal threaded hole 396 to accept screw 372. The head portion 389 extends generally outwardly from the grip face 373. Control shaft 361 extends through axlecaps 42 and 44 and sleeve 358. Snapring 364 is nested and engaged in corresponding circumferential snapring groove 366 at a predetermined axial location along its length. The step sleeve 347 is assembled to the control shaft 361 with internal threads 349 threadably engaged to external threads 362 and threadably adjusted to a predetermined axial position therebetween whereby end face 346 is axially spaced from transition surface 375 by distance 344, which preferably corresponds to the axial distance 391 between outboard face 340a and inboard face 338b. The step sleeve 347 is then locked to the control shaft 361 by means of crimping or adhesive to freeze, lock or otherwise maintain this predetermined axial position. It is noted that shank portion 388 extends axially through step sleeve 347 such that end portion 399 may be considered as a radially relieved surface relative to the step sleeve 347 that is also axially outboard of the end face 346.

Snapring 364 provides an axial end stop for step washer 345 and compression spring 397, which is positioned between step washer 345 and axlecap 44 as shown, and which serves to axially bias the control shaft assembly 360 in direction 395 toward the engagement end relative to the sleeve 358. The components of the hub assembly 330 are assembled as shown in FIG. 4b, in an arrangement roughly similar to that shown in FIG. 2b. The assembled axle assembly 324 preferably provides a fixed axial distance between outer faces 46a and 46b as is conventional. For explanation purposes and referring to FIGS. 4a-b, it is understood that an orientation described as "toward the engagement end" or "engagement end" refers to an axial location proximal to the end portion 399 and distal the head portion 389.

The threadable assembly of the screw 372 with the internal threaded hole 396 provides an axially outward limit stop for the threadable travel of the knob 350 with respect to the control shaft 361. In contrast to the embodiment of FIGS. 2a-n, where the spring 97 serves to bias the control shaft 60 toward the retracted position with the end portion 99 proximal to the outer face 46a and grip face 73 distal from outer face 46b, FIGS. 4a-i shows the spring 397 serving to bias the control shaft 361 toward the axially extended position with the end portion 399 distal from the outer face 46a and the grip face 373 proximal to outer face 46b. FIG. 4b shows the control shaft 361 in the extended position as biased by spring 97, with the knob 350 unthreaded relative to the control shaft 361 in the axially outward direction to be abutting the washer 370, which corresponds to an axially open position of the knob 350 relative to the control shaft 361. In contrast to the threadable engagement between the control shaft assembly 60 and the adapter 100, which is radially fixed to the dropout 32a as described in FIGS. 2a-n, the threadable assembly between the control shaft 361 and the knob 350 described in FIGS. 4a-i remains radially fixed to the hub assembly 330. Further, this threadable assembly may be considered to be between two portions (i.e. control shaft 361 and knob 350) of the control shaft assembly 360.

Figure 4C:
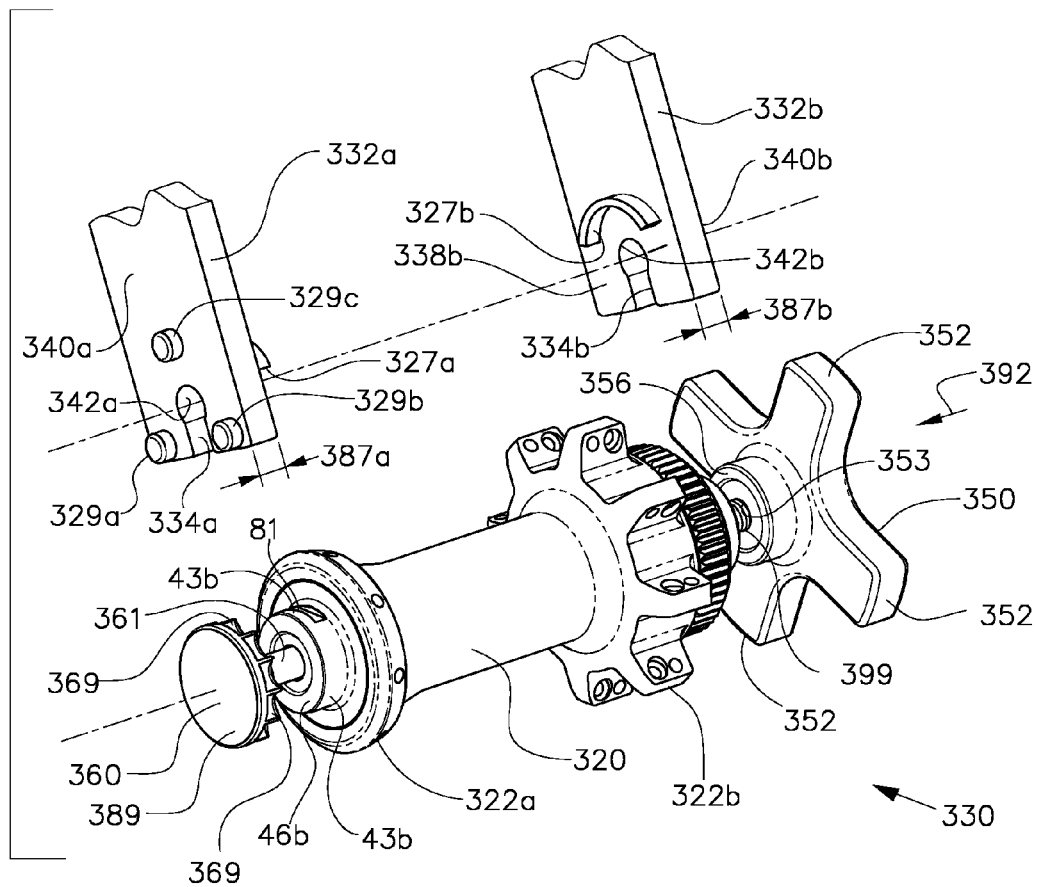
FIGS. 4c-e are perspective views of the embodiment of FIG. 4a, showing the progressive sequential assembly steps involved in assembling the hub assembly to the dropouts.
Figure 4D:
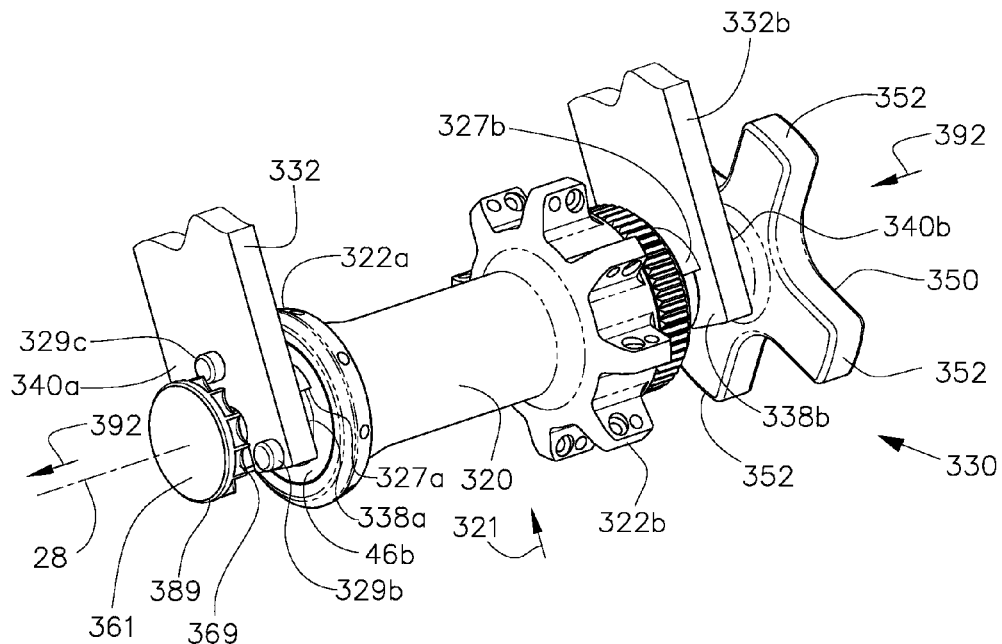
Figure 4E:
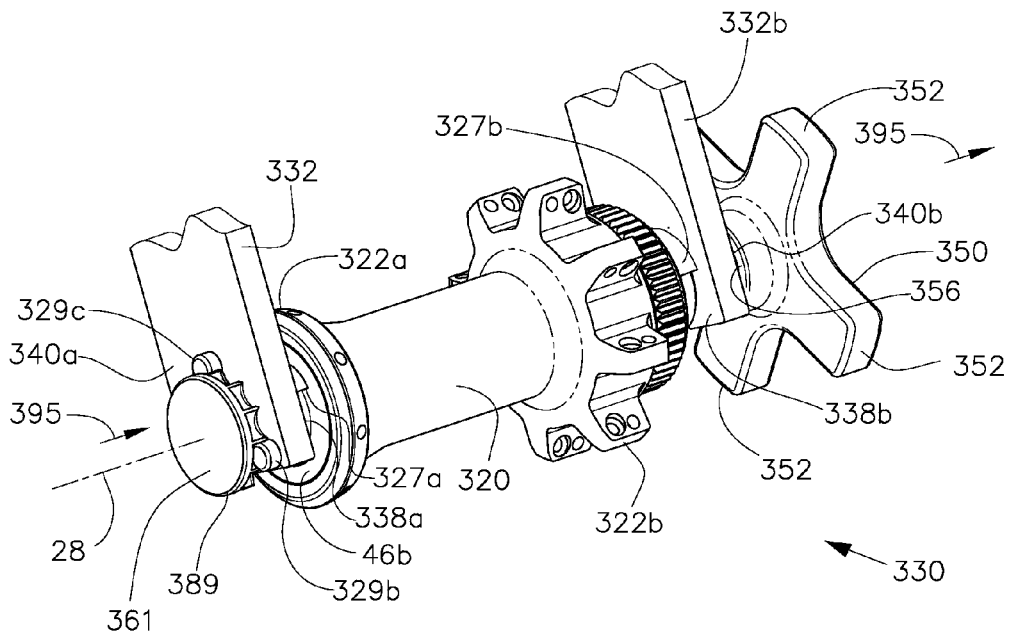
Figure 4F:
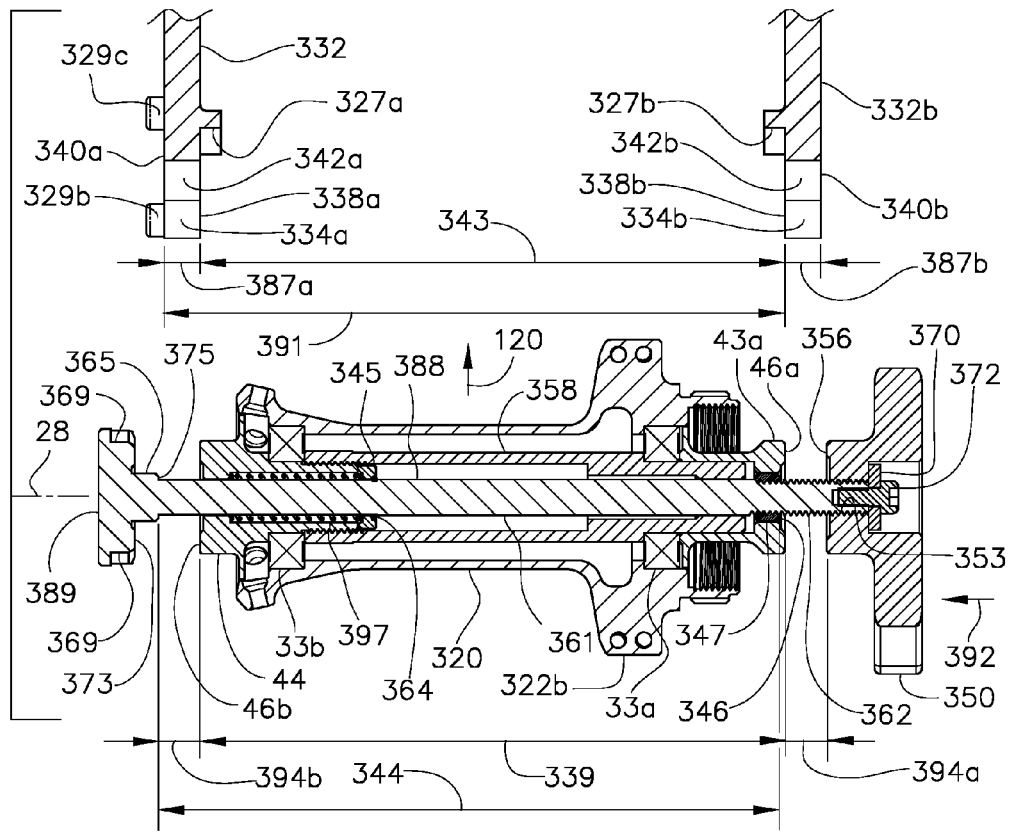
FIGS. 4f-i are axial cross-sectional views taken along 51-51 of the embodiment of FIG. 4a, showing the progressive sequential steps involved in assembling the hub assembly to the dropouts.
Figure 4G:
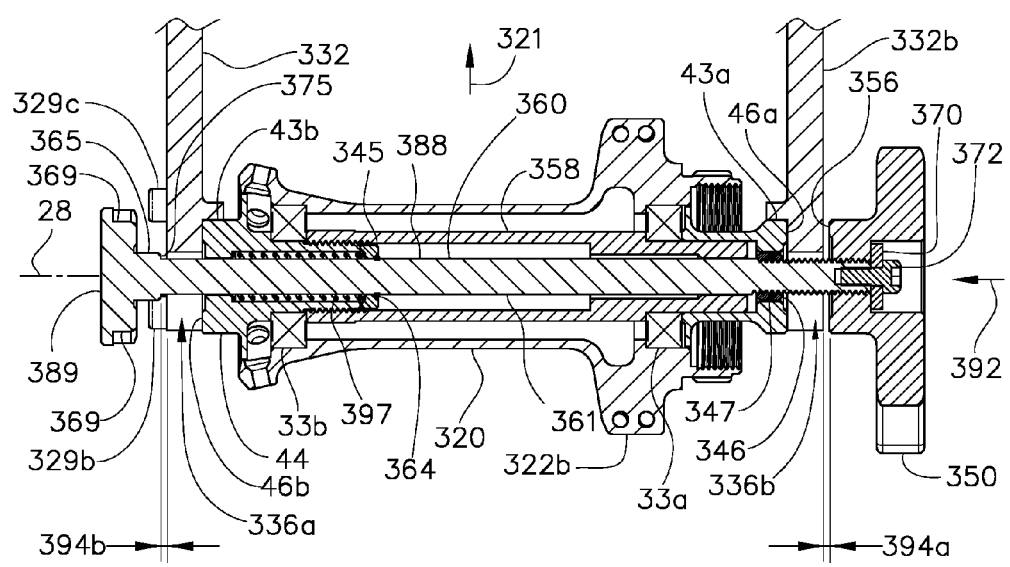

From the extended and open positions as described in FIG. 4b, the control shaft 360 is next axially shuttled in extending direction 392 relative to hub shell 320 and axle assembly 324 (by manually pressing knob 350) until the stop washer 345 axially abuts the end face 70 to expand the gap 394b and contract the gap 394a as shown in FIGS. 4c and 4f. Gaps 394a and 394b, as shown in FIG. 4f, are preferably sized to be slightly larger than corresponding dropout thicknesses 387a and 387b respectively to provide clearance for radial assembly therebetween (as shown in FIG. 4d and FIG. 4g). FIGS. 4c and 4f show the hub assembly 330 positioned in preparation for radial assembly with dropouts 332a and 332b. The transition surface 375 is preferably axially aligned to be axially coincident or axially outboard of the outer face 340a and the end face 346 is axially coincident or axially inboard of inner face 338b and shank portion 388 is radially aligned with necked entrance regions 334a and 334b.

Figure 4H:
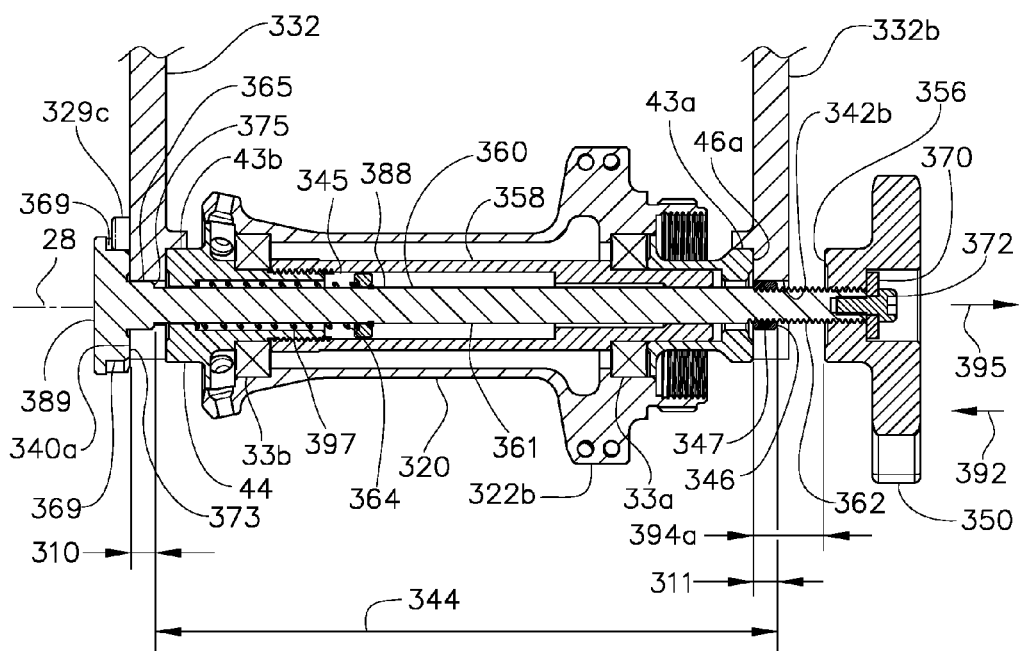

Next, the hub assembly 330 is radially assembled to the dropouts 338a and 338b in direction 321 as shown in FIGS. 4d and 4g, with shank portion 388 and end portion 399 passing through necked entrance regions 334a and 334b respectively until alignment surfaces 43a and 43b are radially abutting and nested with alignment surfaces 327a and 327b respectively and stepped portion 365 and step sleeve 347 are radially aligned with respective pilot portions 342a and 342b. Next, as shown in FIGS. 4e and 4h, the control shaft assembly 360 is axially released and the spring 397 serves to bias and shuttle the control shaft assembly 360 in the retracting direction 395 until grip face 373 axially abuts outboard face 340a. Now, stepped portion 365 axially overlaps the pilot portion 342a by distance 310 to radially engage the hub assembly 330 with the dropout 332a and step sleeve 347 axially overlaps pilot portion 342b by distance 311 to radially engage the hub assembly 330 with the dropout 332b. The hub assembly 330 is now in a pre-engaged position such that it is engaged and retained to the dropouts 332a and 332b. Additionally, key projections 329a-c are now axially overlapping and circumferentially keyed and engaged to key notches 369 to create a circumferentially keyed engagement to limit rotation of the control shaft 361 about axial axis 28 relative to the dropout 332a. The radial engagement between the key projections 329a and 329b with their mating key notches 369 of head portion 389 also provides a redundant radial pre-engagement between the hub assembly 330 and the dropout 332a. The knob 350 is still shown to be in the open position.

Figure 4I:
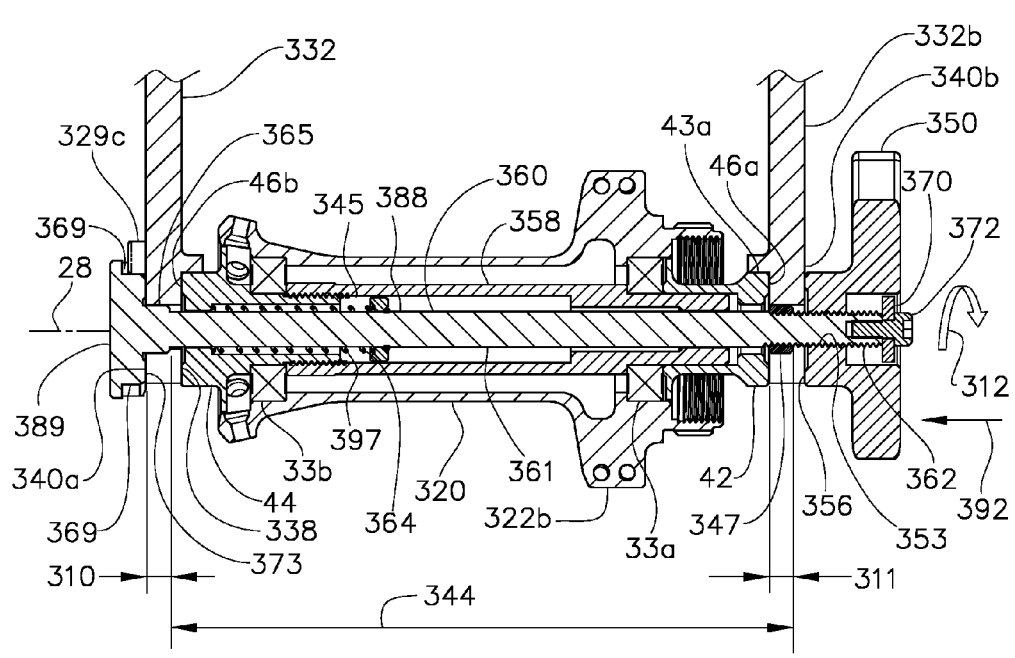

FIGS. 4e, 4h, and 4i shows two redundant radial engagements between the hub assembly 330 and dropout 332a: (i) the radial engagement between key projections 329a and 329b and head portion 389 (which is axially outboard of grip face 373), and (ii) the radial engagement between stepped portion 365 and pilot portion 342a (which is axially inboard of grip face 373). It is understood that one of these radial engagements may be omitted to still provide a radial engagement between the hub assembly 330 and dropout 332a.

As the control shaft assembly 360 is axially shuttled as described, it may be preferable that the axial overlap 310 of stepped portion 365 with pilot region 342a be generally equal to the axial overlap 311 of the step sleeve 347 with the pilot region 127 so that both of these radial engagements are initiated generally simultaneously during this assembly sequence described herein. This also insures that these two radial engagements will release generally simultaneously as the control shaft assembly 360 is axially shuttled in direction 392 during disassembly and radial release of the hub assembly 330 from the dropouts 332a and 332b. Similarly, it may be preferable that hub spacing distance 339 is equal to or nearly equal to dropout spacing distance 343 and that distance 344 (between transition surface 375 and end face 346) is equal or nearly equal to distance 391 (between outboard face 340a and inboard face 338b) such that, as control shaft 360 is axially shuttled in direction 395, these two radial overlie engagements are initiated simultaneously or nearly simultaneously.

Next, as shown in FIG. 4i, the knob 350 is rotated in direction 312 to threadably tighten the knob 350 relative to the control shaft 361 and to axially advance the grip face 356 in direction 392 until it contacts the outboard face 340b, corresponding to an axially closed position of the knob 350. As the knob 350 is threadably tightened, the distance between grip faces 373 and 356 is contracted and the axial gap 394a is reduced, limiting the amount that the control shaft 361 may be inadvertently displaced indirection 392, thus insuring that the two radial overlie engagements may not be inadvertently disengaged. Further threadable tightening serves to axially sandwich, clamp, and grip the dropout 332b between the grip face 356 and outer face 46a and also serves to axially sandwich, clamp, and grip the dropout 332a between the grip face 373 and outer face 46b. The control shaft assembly 360 is now in a clamped position where the control shaft assembly 360 is radially engaged and axially clamped to dropouts 332a and 332b. The circumferential engagement between key projections 329 and key notches 369 provide a convenience to aid in preventing the control shaft 360 from rotating as the knob 350 is threadably tightened. The hub assembly 330 is now firmly installed and assembled to the dropouts 332a and 332b.

While the hub assembly 330 is retained to dropouts 332a and 332b and the control shaft assembly 360 is in the pre-engaged position (as shown in FIG. 4h), this retained configuration normally serves as a convenience to maintain the axial alignment of the control shaft assembly 360 with respect to the dropouts 332a and 332b. The pre-engaged position also serves as a safety retaining means to restrict separation of the hub assembly 330 from the dropouts 332a and 332b in the event that the knob 350 had not been threadably tightened and control shaft assembly 360 had inadvertently not been placed in the clamped position. While the clamped position is not required to assemble the hub assembly 330 to the dropouts 332a and 332b, the threadably tightened assembly associated with the clamped position is preferred as it serves to fortify and solidify this assembly.

In contrast to the pre-engaged position shown in FIG. 2h, where the control shaft 61 will be further displaced in the extending direction 121 to the engaged position shown in FIG. 2i, the pre-engaged position shown in FIGS. 4e and 4h also axially corresponds to the engaged position of the control shaft assembly 360 shown in FIG. 4i, as no further axial displacement is required between these two positions.

The procedure for uninstallation and removal of the hub assembly 330 from the dropouts 332a and 332b is basically the reverse of the assembly and installation sequence just described. For removal, the knob 350 is unscrewed in the direction opposite to direction 312 to unthread the knob 350 to the axially open orientation shown in FIG. 4h. Next, the control shaft assembly 360 is axially shuttled in direction 392 by manually pressing knob 350 until the stop washer 345 axially abuts the end face 70 in the configuration shown in FIGS. 4d and 4g. The collar portion 365 and step sleeve 347 are no longer axially overlapping and radially engaged to their respective dropouts 332a and 332b. The hub assembly 330 may now be radially uninstalled and removed from the dropouts 332a and 332b in a direction opposite to direction 321, to the configuration of FIGS. 4c and 4f. Since distances 310 and 311 are equal or nearly equal, the release of these two radial engagements are axially timed to initiate and occur simultaneously as mentioned hereinabove.

The embodiment of FIGS. 2a-n shows the external threads 62 as threadably mated to internal threads 107 of the dropout 32a (by means of adapter 100) as a means to achieve the clamped position of the control shaft assembly 60 and serves to clamp the hub assembly 30 and dropout 32b between the grip face 73 of the control shaft 361 and the dropout 32a (via adapter 100). In contrast, the embodiment of FIGS. 4a-i shows the external threads 362 as threadably mated to the internal threaded hole 353 of the knob 350, which may be considered as a portion of the control shaft assembly 360. Also, this threaded engagement serves to clamp the hub assembly 30 and both dropouts 332a and 332b between the grip faces 373 and 356 of the control shaft assembly 360.

FIGS. 4a-i describe an embodiment where both dropouts 332a and 332b have open slots 336a and 336b respectively and are considered as "open" dropouts. The threaded engagement to clamp the dropouts 332a and 332b is between the control shaft 361 and the knob 350, which is part of the control shaft assembly 360. This is in contrast to the embodiment of FIGS. 2a-n, where one of the dropouts (dropout 32a, with adapter 100 installed) is a "closed" dropout that circumferentially surrounds the end portion 99 of the control shaft 61. Both embodiments utilize the axial shuttle of control shaft and multiple radial engagements that are axially spaced and "timed" to engage and release both dropouts generally simultaneously. This is a key feature since it helps to minimize or prevent the possibility of a situation where the control shaft is radially engaged to one dropout and radially released from the other dropout. Without this feature, the hub assembly can become skewed and non-parallel with the axial axis of the dropout, which may then cause binding therebetween and would hinder or prevent the smooth and easy assembly of the hub assembly with the dropouts.

The embodiment of FIGS. 4a-i shows a threaded engagement between internally threaded hole 353 and external threads 362 that is utilized to axially advance the grip face 356 and adjust the gap 394a. Alternatively, the grip face 356 may be axially displaced by a variety of means, including a cam and follower mechanism of a design well known in industry.

While my above description contains many specificities, these should not be construed as limitations on the scope of the invention, but rather as exemplifications of embodiments thereof. For example:

While the embodiments of FIGS. 2a-n and 4a-i include a spring 97 and 397 respectively to bias the control shaft in the engagement direction toward the pre-engaged and clamped positions, this is merely the preferred arrangement for ease of use and for the safety of maintaining the pre-engaged position. This spring is merely a representative means to axially bias the control shaft relative to the remainder of the hub assembly. Alternatively, the bias spring may be eliminated, and the control shaft may not be axially biased. As a further alternative, the hub assembly may include a means to axially bias the control shaft in the retracting direction toward the retracted position.

While the embodiments of FIGS. 2a-n and 4a-i show the control shaft to be positively retained and axially inseparable from the remainder of the hub assembly, this is merely the preferred arrangement for convenience. This retention serves to provide a pre-determined axial end-stop to control the axial travel of the control shaft in the retracting direction and also serves to prevent the control shaft from being lost or separated from the remainder of the hub assembly. Alternatively, this retaining means may be eliminated and the control shaft may become completely withdrawn from the remainder of the hub assembly. As a further alternative, the axial retaining means may be a yieldable retaining means, such as a linear detent or the like.

While the embodiments of FIGS. 2a-n and 4a-i show the shank portion and head portion of the control shaft as a one-piece monolithic and integral component. Alternatively, the control shaft may be created as an assembly of multiple pieces. For example, the head portion may be threadably assembled to the shank portion. Further, while the shank portion and head portion are shown to be rotationally and axially fixed relative to each other, this is provided as a preferred convenience to permit the shank portion to be easily controlled and/or manipulated through the head portion. Alternatively, the head portion may be axially and/or circumferentially displaceable relative to the shank portion and vice versa.

While the embodiments of FIGS. 2a-n and 4a-i include a sleeve (58 and 358), this sleeve is provided merely as an axial spacer between the inner races of bearings 33a and 33b and to provide an aperture to pilot the control shaft (61 and 361). Alternatively, this sleeve component may be omitted in the assembly and the control shaft may simply be piloted within the inside diameter of bearing 33a and 33b, with the axial spacing between the bearings being controlled by the hub shell (20 and 320).

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications that are within its spirit and scope as defined by the claims.

What is claimed is:
1. A vehicle wheel hub assembly, comprising:
an axle element that is rotationally stationary about an axial axis, including an axially extending opening therethrough;
a hub shell element that is rotatable about said axle element and about said axial axis, including a first end portion and a second end portion axially spaced from said first end portion;
a frame element, including first frame member and a second frame member to interface with said hub assembly, including an axial space between said first frame member and said second frame member;
a control shaft extending within said axially extending opening;
wherein said axle element includes a first outer face axially adjacent said first end portion and axially proximal said first frame member, and a second outer face axially proximal said second end portion, wherein said first outer face is axially spaced and axially opposed relative to said second outer face;
wherein said control shaft includes an engagement end, and a clamping end axially distal from said engagement end that includes an enlarged head portion adjacent thereto with an axially inwardly facing grip face, and a shank portion extending between said engagement end and said grip face;

wherein said control shaft includes a first engagement surface axially proximal to said engagement end and a second engagement surface axially proximal to said clamping end, with an axial distance between said first engagement surface and said second engagement surface;

wherein said first frame member includes an axially inward facing first inboard face, and a first retaining surface;

wherein said second frame member includes an open slot, with an open entrance portion, to radially receive said control shaft, an axially outward facing second outboard face, an axially inward facing second inboard face, and a second retaining surface;

wherein said control shaft is axially displaceable relative to said hub shell element between: (i) a retracted position, wherein said engagement end is in an axially inward orientation and said control shaft is radially disengaged from both said first frame member and said second frame member, and said hub assembly may be radially displaced relative to both said first frame member and said second frame member; and (ii) a pre-engaged position, wherein said engagement end is axially outward relative to said retracted position, and wherein said first engagement surface is axially overlapping said first retaining surface by a first overlap distance such that said first engagement surface is radially overlying said first retaining surface in a first radial engagement to radially retain said hub assembly with said first frame member, and wherein said second engagement surface is axially overlapping said second retaining surface by a second overlap distance such that said second engagement surface is radially overlying said second retaining surface in a second radial engagement to radially retain said hub assembly with said second frame member; and including an axial separation between said first radial engagement and said second radial engagement, wherein said axial separation corresponds to said axial space such that, at least one of: (i) in the transition between said retracted position and said pre-engaged position, said first radial engagement and said second radial engagement are initiated generally simultaneously; and (ii) in the transition between said pre-engaged position and said retracted position, said first radial engagement and said second radial engagement are released generally simultaneously.

2. The vehicle wheel hub assembly according to claim 1, wherein, with said control shaft in said pre-engaged position, said control shaft may be manipulated to axially clamp and sandwich said axle element between said first frame member and said second frame member in a clamped position of said control shaft.

3. The vehicle wheel hub assembly according to claim 2, wherein said engagement end includes a threaded portion axially adjacent thereto, including a threadable engagement between said threaded portion and one of said first frame member and a second portion of said control shaft, and wherein said clamped position is achieved by means of threadable tightening of said threadable engagement.

4. The vehicle wheel hub assembly according to claim 3, wherein said threaded portion includes external threads and said first frame member includes internal threads and wherein said threadable engagement is between said external threads and said internal threads.

5. The vehicle wheel hub assembly according to claim 4, wherein, said internal threads are rotationally fixed to said first frame member about said axial axis.

6. The vehicle wheel hub assembly according to claim 4, wherein said control shaft includes a pilot tip adjacent said engagement end and wherein, in said pre-engaged position, said pilot tip is axially overlapping said first frame member and wherein said pilot tip is sized to be equal to or smaller than the minor diameter of said internal threads and wherein, in said pre-engaged position, said pilot tip is axially overlapping said internal threads.

7. The vehicle wheel hub assembly according to claim 4, wherein said first frame member includes a counterbore axially aligned with and axially inboard of said internal threads, and wherein, in said pre-engaged position, said engagement end is axially overlapping said counterbore, and wherein said counterbore is sized to be equal to or larger than the major diameter of said external threads and wherein, in said pre-engaged position, said external threads are axially overlapping said counterbore.

8. The vehicle wheel hub assembly according to claim 3, wherein said threaded portion includes external threads and said second portion of said control shaft includes internal threads and wherein said threadable engagement is between said external threads and said internal threads.

9. The vehicle wheel hub assembly according to claim 2, wherein said second frame member is axially sandwiched and gripped between said second end face and said grip face in said clamped position.

10. The vehicle wheel hub assembly according to claim 9, wherein said grip face serves to provide a limit stop to limit the axial travel of said control shaft in said clamped position.

11. The vehicle wheel hub assembly according to claim 1, wherein, with said control shaft in said pre-engaged position, said control shaft is radially piloted and axially aligned with said first frame member and said second frame member.

12. The vehicle wheel hub assembly according to claim 1, wherein said control shaft includes a second portion connected thereto including a second grip face, and wherein said second grip face is axially displaceable relative to said grip face between an axially expanded position and an axially contracted position, wherein said axial displacement of said control shaft relative to said hub shell element is axially limited in said axially contracted position to maintain said first radial engagement and said second radial engagement.

13. The vehicle wheel hub assembly according to claim 12, including a threadable engagement between said control shaft and said second portion and wherein the means for said axial displacement of said second grip face relative to said grip face includes threadable adjustment of said threadable engagement.

14. The vehicle wheel hub assembly according to claim 12, wherein, in said pre-engaged position, said second portion is circumferentially keyed to said frame element to limit rotation therebetween about said axial axis.

15. The vehicle wheel hub assembly according to claim 12, wherein said first radial engagement is in said second portion.

16. The vehicle wheel hub assembly according to claim 1, wherein said first overlap distance is generally equal to said second overlap distance.

17. The vehicle wheel hub assembly according to claim 1, wherein said first overlap distance is within one millimeter of said second overlap distance.

18. The vehicle wheel hub assembly according to claim 1, wherein said first overlap distance is within three millimeters of said second overlap distance.

19. The vehicle wheel hub assembly according to claim 1, wherein said first overlap distance is larger than said second overlap distance.

20. The vehicle wheel hub assembly according to claim 1, wherein said first overlap distance is smaller than said second overlap distance.

21. The vehicle wheel hub assembly according to claim 1, wherein said second radial engagement is axially outboard of said grip face.

22. The vehicle wheel hub assembly according to claim 1, wherein said second radial engagement is axially inboard of said grip face.

23. The vehicle wheel hub assembly according to claim 1, including a radial position engagement between said axle element and at least one of said first frame member and said second frame member to provide radial positional alignment therebetween independently of said control shaft.

24. The vehicle wheel hub assembly according to claim 1, wherein said first retaining surface is in an enclosed hole to axially receive and circumscribe said engagement end.

25. The vehicle wheel hub assembly according to claim 1, wherein said first frame member includes an open slot, with an open entrance portion, to radially receive said control shaft.

26. The vehicle wheel hub assembly according to claim 1, wherein at least one of; (i) said open slot of said second frame member is a radially stepped open slot, including a pilot portion thereof of larger radial dimension that is radially inboard of an open entrance portion of narrower radial dimension than said pilot portion, wherein said pilot portion includes said second retaining surface; and (ii) wherein said first frame member includes an open slot, with an open entrance portion to radially receive said control shaft, wherein said open slot is a radially stepped open slot, including a pilot portion thereof of larger radial dimension that is radially inboard of an open entrance portion of narrower radial dimension than said pilot portion, wherein said pilot portion includes said first retaining surface.

27. The vehicle wheel hub assembly according to claim 26, wherein said shank portion includes an enlarged stepped portion axially inboard of said grip face and a relieved portion axially offset from said stepped portion and of smaller radial dimension than said stepped portion, and a transition surface between said relieved portion and said stepped portion, wherein said stepped portion may be positioned to be axially overlapped within said pilot portion to provide a corresponding one of said first radial engagement and said second radial engagement.

28. The vehicle wheel hub assembly according to claim 27, wherein said open slot of said second frame member is a radially stepped open slot, including a pilot portion thereof of larger radial dimension that is radially inboard of an open entrance portion of narrower radial dimension than said pilot portion, wherein said pilot portion includes said second retaining surface, and wherein said first frame member includes an open slot, with an open entrance portion to radially receive said control shaft, wherein said open slot is a radially stepped open slot, including a pilot portion thereof of larger radial dimension that is radially inboard of an open entrance portion of narrower radial dimension than said pilot portion, wherein said pilot portion includes said first retaining surface, and wherein said control shaft includes a multiplicity of said stepped portions, including a first stepped portion to provide said first engagement surface for said first radial engagement with said pilot portion of said first frame member, and a second stepped portion to provide said second engagement surface for said second radial engagement with said pilot portion of said second frame member provide said second engagement.

29. The vehicle wheel hub assembly according to claim 27, wherein at least one of said stepped portion and said relieved portion includes generally circular cylindrical geometry that extends along said axial axis.

30. The vehicle wheel hub assembly according to claim 29, wherein both said stepped portion and said relieved portion includes generally circular cylindrical geometry that extends along said axial axis, and wherein said relieved portion is generally concentric with said stepped portion.

31. The vehicle wheel hub assembly according to claim 26, wherein said shank portion includes an enlarged stepped portion and a relieved portion axially offset from said stepped portion and of smaller radial dimension than said stepped portion, and a transition surface between said relieved portion and said stepped portion, wherein in said retracted position, said relieved portion is axially aligned with said entrance portion such that said relieved portion may be radially passed through said entrance portion, and wherein, in said pre-engaged position, said stepped portion has been displaced to be axially overlapping and piloted within said pilot region such that said stepped portion is radially retained within second frame member.

32. The vehicle wheel hub assembly according to claim 1, wherein at least one of said first frame member and said second frame member includes an open slot, with an open entrance portion, to radially receive said control shaft, and wherein said open slot is an axially stepped slot, including an engagement surface projecting axially outwardly from said outboard face, wherein said engagement surface includes a corresponding one of said first retaining surface and said second retaining surface, and wherein said control shaft includes an enlarged head portion axially outboard of said grip face, and a relieved portion of smaller radial dimension than said head portion that is axially inboard of said grip face, wherein, in said pre-engaged position, said head portion is axially overlapping said engagement surface to provide a corresponding one of said first radial engagement and said second radial engagement.

33. The vehicle wheel hub assembly according to claim 1, wherein said shank portion includes an enlarged stepped portion and a relieved portion axially offset from said stepped portion and of smaller radial dimension than said stepped portion, and a transition surface between said relieved portion and said stepped portion, wherein said relieved portion is axially inboard of said stepped portion.

34. The vehicle wheel hub assembly according to claim 1, wherein said shank portion includes an enlarged stepped portion and a relieved portion axially offset from said stepped portion and of smaller radial dimension than said stepped portion, and a transition surface between said relieved portion and said stepped portion, wherein said relieved portion is axially outboard of said stepped portion.

35. The vehicle wheel hub assembly according to claim 1, wherein said control shaft includes a noncircular portion thereof to facilitate manual manipulation of said control shaft.

36. The vehicle wheel hub assembly according to claim 1, wherein said control shaft is positively retained to said hub assembly to restrict separation between said control shaft and the remainder of said hub assembly.

37. The vehicle wheel hub assembly according to claim 1, wherein said axle element has a fixed axial distance between said first outer face and said second outer face.

38. The vehicle wheel hub assembly according to claim 1, wherein, in said retracted position, said engagement end is one of axially flush and axially recessed relative to said first outer face.

39. The vehicle wheel hub assembly according to claim 1, wherein said control shaft is piloted within said axially extending opening of said axle element for radial location control between said control shaft and said axle element.

40. The vehicle wheel hub assembly according to claim 1, wherein said first engagement surface includes an axially outward first leading edge and said second engagement surface includes an axially inward second leading edge including an axial shaft engagement distance between said first leading edge and said second leading edge; wherein said first retaining surface includes an axially inward first entrance edge and said second retaining surface includes an axially outward second entrance edge, including an axial frame engagement distance between said first entrance edge and said second entrance edge, and wherein said axial shaft engagement distance is generally equal to said axial frame engagement distance.

41. The vehicle wheel hub assembly according to claim 1, wherein said control shaft may be linearly shuttled between said retracted position and said pre-engaged position in at least one of an engaging direction corresponding to the axially outwardly displacement of said engagement end, and a retracting direction corresponding to the axially inwardly displacement of said engagement end.

\* \* \* \* \*